(12) United States Patent
Higa

(10) Patent No.: US 11,475,673 B2
(45) Date of Patent: Oct. 18, 2022

(54) IMAGE RECOGNITION DEVICE FOR DETECTING A CHANGE OF AN OBJECT, IMAGE RECOGNITION METHOD FOR DETECTING A CHANGE OF AN OBJECT, AND IMAGE RECOGNITION SYSTEM FOR DETECTING A CHANGE OF AN OBJECT

(71) Applicant: NEC Corporation, Tokyo (JP)

(72) Inventor: Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 44 days.

(21) Appl. No.: 16/769,511

(22) PCT Filed: Sep. 26, 2018

(86) PCT No.: PCT/JP2018/035814
§ 371 (c)(1),
(2) Date: Jun. 3, 2020

(87) PCT Pub. No.: WO2019/111501
PCT Pub. Date: Jun. 13, 2019

(65) Prior Publication Data
US 2021/0166037 A1    Jun. 3, 2021

(30) Foreign Application Priority Data
Dec. 4, 2017    (JP) .............................. JP2017-232451

(51) Int. Cl.
*G06V 20/52*    (2022.01)
*G06T 7/70*    (2017.01)
(Continued)

(52) U.S. Cl.
CPC ........... *G06V 20/52* (2022.01); *G06Q 10/087* (2013.01); *G06T 7/20* (2013.01); *G06T 7/70* (2017.01);
(Continued)

(58) Field of Classification Search
None
See application file for complete search history.

(56) References Cited

U.S. PATENT DOCUMENTS 8,321,302 B2 * 11/2012 Bauer ................ G08B 13/2474
705/28
9,911,290 B1 * 3/2018 Zalewski ........... G06Q 30/0633
(Continued)

FOREIGN PATENT DOCUMENTS

JP    2002-318277 A    10/2002
JP    2002318277 A  * 10/2002
(Continued)

OTHER PUBLICATIONS

Japanese Office Action for JP Application No. 2019-558021 dated Aug. 3, 2021 with English Translation.
(Continued)

*Primary Examiner* — Delomia L Gilliard

(57) ABSTRACT

An image processing device has: a change detecting unit configured to, based on a captured image in which an product to be monitored is shown, detect a change in display status of the product; and a display detecting unit configured to detect that the product is returned to a different place from a place where the product has been picked up based on the change in display status of the product detected by the change detecting unit and on a person included in the captured image.

13 Claims, 30 Drawing Sheets

(51) Int. Cl.
    *G06Q 10/08* (2012.01)
    *G06T 7/20* (2017.01)
    *G06V 40/10* (2022.01)

(52) U.S. Cl.
    CPC .... *G06V 40/10* (2022.01); *G06T 2207/30196* (2013.01); *G06T 2207/30232* (2013.01)

(56) References Cited

U.S. PATENT DOCUMENTS

| | | | |
|---|---|---|---|
| 11,295,270 B2* | 4/2022 | Fisher | G06N 3/04 |
| 2010/0161435 A1* | 6/2010 | Shimizu | G06Q 20/203 |
| | | | 705/22 |
| 2015/0176227 A1 | 6/2015 | Rohr et al. | |
| 2015/0262460 A1* | 9/2015 | Ito | G08B 13/22 |
| | | | 340/568.1 |
| 2015/0269818 A1* | 9/2015 | Jain | G08B 13/2488 |
| | | | 340/572.1 |
| 2016/0203499 A1* | 7/2016 | Yamashita | G06Q 30/0201 |
| | | | 705/7.29 |
| 2017/0323376 A1 | 11/2017 | Glaser et al. | |
| 2019/0149725 A1* | 5/2019 | Adato | H04N 1/32144 |
| | | | 348/158 |
| 2019/0236531 A1* | 8/2019 | Adato | G06K 9/00771 |
| 2020/0097724 A1* | 3/2020 | Chakravarty | G06K 9/00771 |

FOREIGN PATENT DOCUMENTS

| | | |
|---|---|---|
| JP | 2005-284671 A | 10/2005 |
| JP | 2005284671 A * | 10/2005 |
| JP | 2005-347905 A | 12/2005 |
| JP | 2011-014161 A | 1/2011 |
| JP | 2015-176227 A | 10/2015 |
| JP | 6172380 B2 | 8/2017 |
| WO | WO-2015/033577 A1 | 3/2015 |
| WO | WO-2015/079622 A1 | 6/2015 |

OTHER PUBLICATIONS

International Search Report corresponding to PCT/JP2018/035814, dated Nov. 27, 2018, 2 pages.
Zoran Zivkovic, "Improved Adaptive Gaussian Mixture Model for Background Subtraction", Proceedings of the 17th International Conference on Pattern Recognition (ICPR 04), USA, IEEE Computer Society, Aug. 2004, vol. 2-vol. 2, pp. 28-31.

* cited by examiner

MERCHANDISE MONITORING SYSTEM 1

DETECTION RESULT(BINARY IMAGE)

Fig.6

| SECOND NOTED IMAGE | FIRST NOTED IMAGE | CHANGE TYPE |
|---|---|---|
| | | CHANGE DUE TO ITEM NEWLY INCLUDED IN STORE SHELF |
| | | CHANGE DUE TO ITEM NOT INCLUDED IN STORE SHELF |
| | | CHANGE DUE TO CHANGE OF LOOK OF ITEM DISPLAYED IN STORE SHELF |

CLASSIFICATION RESULT 90
91 92 93

Fig.7

| PERSON ID | CAMERA ID | LOCATION INFORMATION(x,y,width,height) | CHANGE TYPE |
|---|---|---|---|
| 1 | 1 | 10 , 0 , 30 , 50 | DECREASE OF ITEMS |
| 2 | 1 | 500 , 250 , 30 , 50 | DECREASE OF ITEMS |
| 3 | 1 | 500 , 250 , 30 , 50 | INCREASE OF ITEMS |
| 4 | 1 | 250 , 300 , 30 , 50 | INCREASE OF ITEMS |
| 5 | 1 | 750 , 100 , 40 , 50 | INCREASE OF ITEMS |

Fig.8

| PERSON ID | CAMERA ID | LOCATION INFORMATION(x,y,width,height) | CHANGE TYPE |
|---|---|---|---|
| 1 | 1 | 10 , 0 , 30 , 50 | DECREASE OF ITEMS |
|   | 1 | 250 , 300 , 30 , 50 | INCREASE OF ITEMS |
| 2 | 1 | 500 , 250 , 30 , 50 | DECREASE OF ITEMS |
|   | 1 | 500 , 250 , 30 , 50 | INCREASE OF ITEMS |
| 5 | 1 | 750 , 100 , 40 , 50 | INCREASE OF ITEMS |

Fig.11

| PERSON ID | CAMERA ID | LOCATION INFORMATION(x,y,width,height) | CHANGE TYPE |
|---|---|---|---|
| 1 | 1 | 10 , 0 , 30 , 50 | DECREASE OF ITEMS |
| 2 | 1 | 500 , 250 , 30 , 50 | DECREASE OF ITEMS |
| 3 | 2 | 100 , 250 , 50 , 70 | INCREASE OF ITEMS |
| 4 | 2 | 250 , 300 , 40 , 60 | DECREASE OF ITEMS |

Fig.12

| PERSON ID | CAMERA ID | LOCATION INFORMATION(x,y,width,height) | CHANGE TYPE |
|---|---|---|---|
| 1 | 1 | 10 , 0 , 30 , 50 | DECREASE OF ITEMS |
|   | 2 | 100 , 250 , 50 , 70 | INCREASE OF ITEMS |
| 2 | 1 | 500 , 250 , 30 , 50 | DECREASE OF ITEMS |
| 4 | 2 | 250 , 300 , 40 , 60 | DECREASE OF ITEMS |

MERCHANDISE MONITORING SYSTEM 4

Fig.16

| PERSON ID | STORE SHELF ID | CAMERA ID |
|---|---|---|
| 1 | STORE SHELF A | 1 |
| 2 | STORE SHELF A | 1 |
| 2 | STORE SHELF A | 1 |
| 1 | STORE SHELF A | 1 |
| 3 | STORE SHELF A | 1 |

Fig.17

| PERSON ID | CAMERA ID | STORE SHELF ID | LOCATION INFORMATION(x,y,width,height) | CHANGE TYPE |
|---|---|---|---|---|
| 1 | 1 | STORE SHELF A | 10 , 0 , 30 , 50 | DECREASE OF ITEMS |
| 2 | 1 | STORE SHELF A | 500 , 250 , 30 , 50 | DECREASE OF ITEMS |
| 2 | 1 | STORE SHELF A | 500 , 250 , 30 , 50 | INCREASE OF ITEMS |
| 1 | 1 | STORE SHELF A | 250 , 300 , 30 , 50 | INCREASE OF ITEMS |
| 3 | 1 | STORE SHELF A | 750 , 100 , 40 , 50 | INCREASE OF ITEMS |

Fig.18

| PERSON ID | CAMERA ID | STORE SHELF ID | LOCATION INFORMATION(x,y,width,height) | CHANGE TYPE |
|---|---|---|---|---|
| 1 | 1 | STORE SHELF A | 10 , 0 , 30 , 50 | DECREASE OF ITEMS |
| | 1 | STORE SHELF A | 250 , 300 , 30 , 50 | INCREASE OF ITEMS |
| 2 | 1 | STORE SHELF A | 500 , 250 , 30 , 50 | DECREASE OF ITEMS |
| | 1 | STORE SHELF A | 500 , 250 , 30 , 50 | INCREASE OF ITEMS |
| 3 | 1 | STORE SHELF A | 750 , 100 , 40 , 50 | INCREASE OF ITEMS |

IMAGE RECOGNITION DEVICE FOR DETECTING A CHANGE OF AN OBJECT, IMAGE RECOGNITION METHOD FOR DETECTING A CHANGE OF AN OBJECT, AND IMAGE RECOGNITION SYSTEM FOR DETECTING A CHANGE OF AN OBJECT

CROSS-REFERENCE TO RELATED APPLICATIONS

This application is a national stage application of International Application No. PCT/JP2018/035814 entitled "IMAGE RECOGNITION DEVICE FOR DETECTING A CHANGE OF AN OBJECT, IMAGE RECOGNITION METHOD FOR DETECTING A CHANGE OF AN OBJECT, AND IMAGE RECOGNITION SYSTEM FOR DETECTING A CHANGE OF AN OBJECT," filed on Sep. 26, 2018, which claims the benefit of the priority of Japanese Patent Application No. JP2017-232451 filed on Dec. 4, 2017, the disclosures of each of which are hereby incorporated by reference in their entirety.

TECHNICAL FIELD

The some non-limiting embodiments relate to an image processing device, an image processing method, and a recording medium.

BACKGROUND ART

It is known that, in retail stores such as a convenience store and supermarkets, various stores, and so on, a monitoring target such as merchandise is monitored using a monitoring camera or the like.

For example, a merchandise monitoring device that monitors the display status of merchandise and also performs notification in accordance with the result of monitoring. To be specific, a merchandise monitoring device that has a merchandise status detection part, a person statues detection part, a notification determination part, and a notification part. Based on a video obtained by capturing an area where merchandise is displayed, the merchandise status detection part detects a merchandise display status such as a display disorder state in which the arrangement of displayed merchandise is disordered or a display shortage state in which the number of displayed merchandise is insufficient. The person status detection part detects a person stay status in a store based on the result of detection of a person detected based on a video obtained by capturing the inside of the store. The notification determination part determines whether or not notification for instructing a store clerk to perform a merchandise management operation, based on the result of detection by the merchandise status detection part and the result of detection by the person status detection part. With such a configuration, it is possible to perform notification for instructing to perform the merchandise management operation in consideration of a person staying status.

A technique for determining, by image processing, whether each visitor extracted by a person region extraction part has picked up an product or has returned an product to a shelf. For example, Patent Document 2 describes that it is determined that a visitor has picked up an object in accordance with the size of a bounding rectangle of the visitor.

A device that detects the tracking of a customer in a store and associates the customer with an product displayed in a location corresponding to the tracking.

The device described merely detects the display disorder or display shortage of merchandise on a certain shelf, and does not take a case into consideration at all in which a customer returns an product to a wrong place. Therefore, the device cannot detect a case where a customer returns an product to a different place on a shelf or a case where a customer puts an product of a different shelf.

Likewise, the technique merely allows for detecting whether a customer has picked up an product or has returned an product to a shelf, and does not allow for detecting a case where a customer returns an product to a different place from its originally arranged place, and so on. Moreover, the device merely sets an product associated with the tracking of a customer as a candidate for the settlement process, and it is impossible to know whether the customer has returned the product to a shelf before the settlement. That is, the device does not take a case into consideration at all in which a customer returns an product to an incorrect place.

Thus, the techniques has caused a problem that it is impossible to detect that a customer returns an product to a different place from its originally arranged place.

SUMMARY

Accordingly, an object of some non-limiting embodiments is to provide an image processing device, an image processing method, and a recording medium that solve the problem that it is impossible to detect that a customer returns an product to a different place from its originally arranged place.

In order to achieve the above object, an image processing device according to an aspect of some non-limiting embodiments has: a change detecting unit configured to, based on a captured image in which an product to be monitored is shown, detect a change in display status of the product; and a display detecting unit configured to detect that the product is returned to a different place from a place where the product has been picked up based on the change in display status of the product detected by the change detecting unit and on a person included in the captured image.

Further, an image processing method according to another aspect of the some non-limiting embodiments is an image processing method executed by an image processing device. The method includes: based on a captured image in which an product to be monitored is shown, detecting a change in display status of the product; and detecting that the product is returned to a different place from a place where the product has been picked up based on the detected change in display status of the product and on a person included in the captured image.

Further, a recording medium according to another aspect of the some non-limiting embodiments is a non-transitory computer-readable medium storing a program comprising instructions for causing an image processing device to realize: a change detecting unit configured to, based on a captured image in which an product to be monitored is shown, detect a change in display status of the product; and a display detecting unit configured to detect that the product is returned to a different place from a place where the product has been picked up based on the change in display status of the product detected by the change detecting unit and on a person included in the captured image.

With the configurations as described above, the some non-limiting embodiments can provide an image processing device, an image processing method, and a recording

BRIEF DESCRIPTION OF DRAWINGS

FIG. 6 is a view showing an example of a classification result output by a region change classification part;

FIG. 7 is a view showing an example of pieces of product-person association information generated by a first association generation part;

FIG. 8 is a view showing an example in which the pieces of product-person association information shown in FIG. 7 are integrated;

FIG. 11 is a view showing an example of pieces of product-person association information generated by a first association generation part and a second association generation part;

FIG. 12 is a view showing an example in which the pieces of product-person association information shown in FIG. 11 are integrated;

FIG. 16 is a view showing an example of tracking data;

FIG. 17 is a view showing an example of pieces of product-person association information generated by a first association generation part;

FIG. 18 is a view showing an example in which the pieces of product-person association information shown in FIG. 16 are integrated;

EXAMPLE EMBODIMENTS

First Example Embodiment

Figure 1:
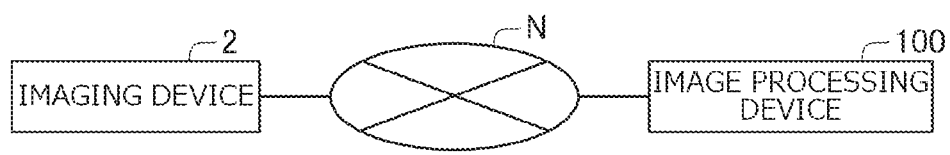
FIG. 1 is a view showing an example of the configuration of a merchandise monitoring system according to a first example embodiment.
Figure 2:
FIG. 2 is a view for describing an example of a scene in which the merchandise monitoring system is used.
Figure 3:
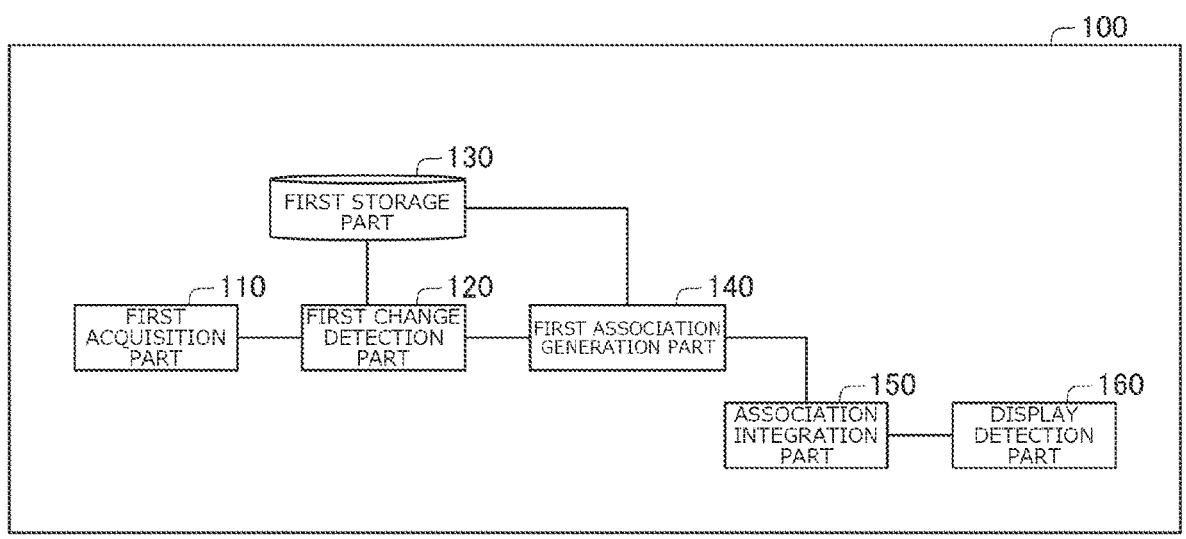
FIG. 3 is a function block diagram showing an example of the configuration of an image processing device.
Figure 4:
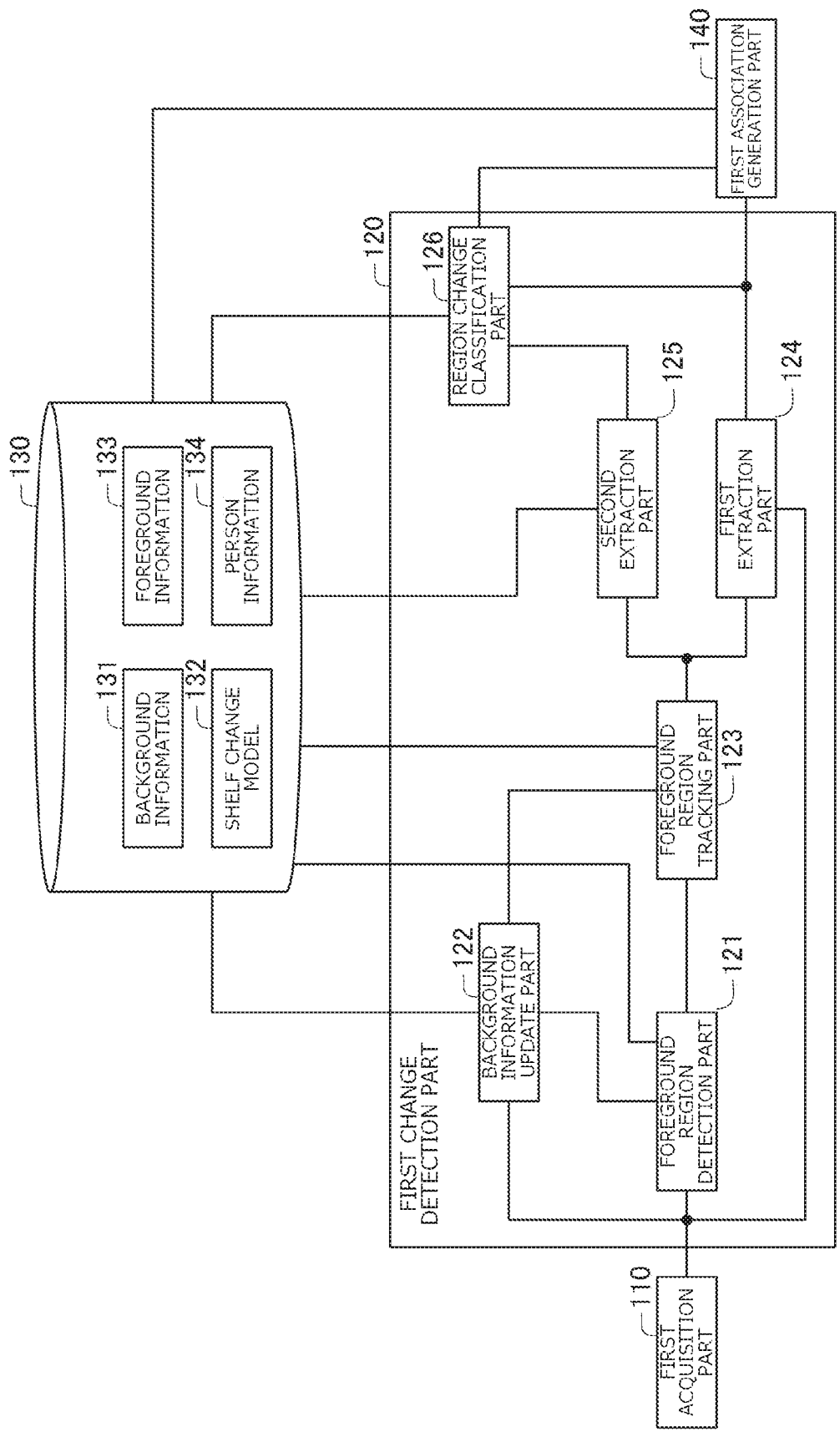
FIG. 4 is a function block diagram showing an example of the configuration of a first change detection part and a first storage part.
Figure 9:
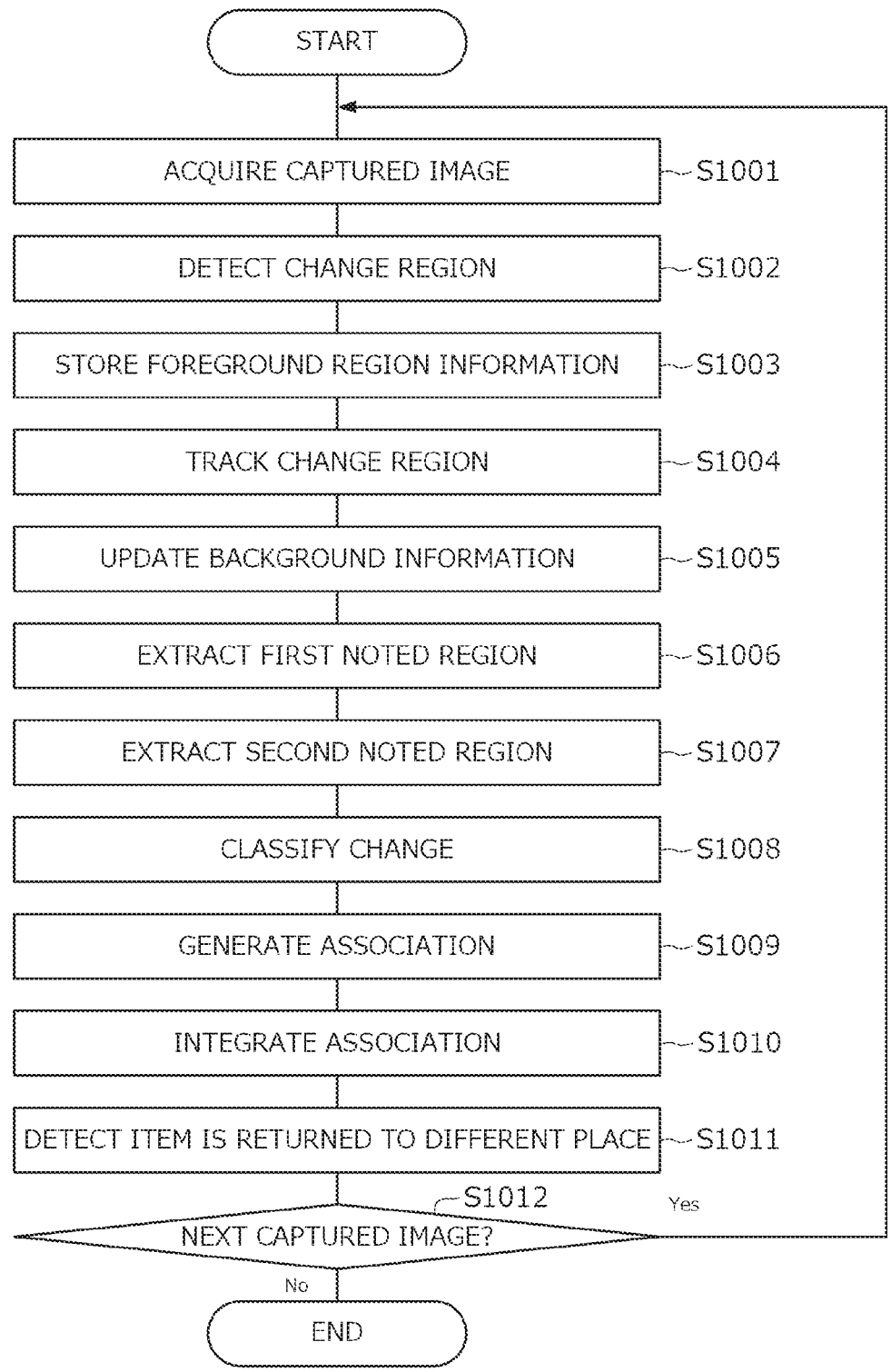
FIG. 9 is a flowchart showing an example of the flow of the operation of the image processing device according to the first example embodiment.

A first example embodiment will be described referring to FIGS. 1 to 9. FIG. 1 is a view showing an example of the configuration of a merchandise monitoring system 1. FIG. 2 is a view for describing an example of a scene in which the merchandise monitoring system 1 is used. FIG. 3 is a function block diagram showing an example of the configuration of an image processing device 100. FIG. 4 is a function block diagram showing an example of the configuration of a first change detection part 120 and a first storage part 130. FIG. 5 is a view for describing the operation of a foreground region detection part 121. FIG. 6 is a view showing an example of a classification result output by a region change classification part 126. FIG. 7 is a view showing an example of pieces of product-person association information generated by a first association generation part 140. FIG. 8 is a view showing an example in which the pieces of product-person association information shown in FIG. 7 are integrated by an association integration part 150. FIG. 9 is a flowchart showing an example of the flow of the operation of the image processing device 100.

In the first example embodiment, the merchandise monitoring system 1 detecting based on a captured image that an product is returned to a different place from a place where the product has been picked up will be described. As will be described later, the merchandise monitoring system 1 of this example embodiment, based on a captured image captured by an imaging device 2, detects a change of a store shelf 3 and also detects a region of a person or an object included in the captured image. Then, the merchandise monitoring system 1 associates the changes of the store shelf 3 with the extracted persons, and also integrates the pieces of associated information on the basis of person. Thus, the merchandise monitoring system 1 is configured to associate the changes of the store shelf 3 on the basis of extracted person. With this, the merchandise monitoring system 1 detects that an product is returned to a different place from a place where the product has been pickup up, for example, when a customer puts an product which he/she has picked up once to a different store shelf 3.

FIG. 1 is a view showing an example of the configuration of the merchandise monitoring system 1 including the image processing device 100 according to this example embodiment. As shown in FIG. 1, the merchandise monitoring system 1 includes the image processing device 100 and the imaging device 2. The image processing device 100 is communicably connected to the imaging device 2 via a network N, for example.

In this example embodiment, the image processing device 100 will be described as a discrete configuration from the imaging device 2. However, the image processing device 100 may be configured to be installed in the imaging device 2. That is, the imaging device 2 may have a function as the image processing device 100 to be described later. Moreover, the image processing device 100 may have a function as the imaging device 2.

Further, FIG. 1 illustrates a case where the number of imaging devices 2 is one. However, the number of the imaging devices 2 included by the merchandise monitoring system 1 is not limited to one. The merchandise monitoring system 1 may have a plurality of imaging devices 2, for example.

FIG. 2 is a view for describing an example of a scene in which the merchandise monitoring system 1 is used. Referring to FIG. 2, in the merchandise monitoring system 1, the imaging device 2 captures an image of the store shelf 3 of a store. Then, the imaging device 2 transmits a video signal representing the captured image to the image processing device 100.

The imaging device 2 is, for example, a monitoring camera installed in a store or the like. The imaging device 2 is installed, for example, in a predetermined position where it can capture an image of the store shelf 3 in a store or the like. To the imaging device 2, a camera ID or the like for identifying the imaging device 2 is assigned. The imaging device 2 acquires a captured image. At this time, for example, the imaging device 2 refers to its clock or the like and associates capture time, which is time when the captured image has been acquired, with the acquired captured image. Thus, the imaging device 2 acquires a captured image showing the status of the store shelf 3 and so on.

A video captured by the imaging device 2 may be a moving image or consecutive still images. In this example embodiment, a captured image acquired by the imaging device 2 is a color image (hereinafter, referred to as an RGB (Red Green Blue) image). A captured image acquired by the imaging device 2 may be an image in color space other than that of an RGB image.

As stated above, the imaging device 2 transmits a video signal representing an acquired captured image to the image processing device 100. The imaging device 2 may store the captured image inside the imaging device 2 or into a different storage unit from that of the image processing device 100.

The image processing device 100 is an information processing device that analyzes a captured image and thereby detects that an product is returned to a different place from a place where the product has been picked up. FIG. 3 shows an example of the configuration of the image processing device 100. For example, as shown in FIG. 3, the image processing device 100 includes a first acquisition part 110, a first change detection part 120 (a change detecting unit), a first storage part 130, a first association generation part 140 (an associating unit, an association generating unit), an association integration part 150 (the associating unit, an association integrating unit), and a display detection part 160 (a display detecting unit). For example, the image processing device 100 has an arithmetic logic unit and a storage unit, which are not shown in the drawings. For example, the image processing device 100 realizes the above processing parts by execution of a program stored in the storage unit (not shown) by the arithmetic logic unit.

The image processing device 100 shown in FIG. 3 shows a configuration that is unique to this disclosure. The image processing device 100 may have a member which is not shown in FIG. 3. This is the same for a second exemplary embodiment thereafter.

The first acquisition part 110 acquires a video signal representing a captured image obtained by the imaging device 2 capturing an image of the store shelf 3. The first acquisition part 110 may receive a video signal transmitted from the imaging device 2. The first acquisition part 110 may acquire a video signal converted based on a captured image stored inside the imaging device 2 or in a storage unit that is different from the imaging device 2 and the image processing device 100.

As stated above, the image processing device 100 may be installed in the imaging device 2. In this case, the first acquisition part 110 may be configured to acquire a captured image.

The first acquisition part 110 converts an acquired video image into an RGB image composing the video signal. Then, the first acquisition part 110 provides the RGB image after converted to the first change detection part 120. Because the RGB image obtained by the first acquisition part 110 converting the video signal represents a captured image obtained by the imaging device 2 capturing an image of the store shelf 3, the RGB image is also referred to as a captured image simply.

FIG. 4 is a function block diagram showing an example of the configuration of the first change detection part 120 and the first storage part 130 in more detail. Referring to FIG. 4, the details of the first change detection part 120 and the first storage part 130 will be described.

The first storage part 130 is a storage device such as a hard disk or a memory. In the first storage part 130, background information 131, a shelf change model 132, foreground information 133, and person information 134 are stored. The first storage part 130 may be realized by a storage device different from the image processing device 100, or may be installed in the first change detection part 120. Moreover, the background information 131, the shelf change model 132, the foreground information 133, and the person information 134 may be stored in the same storage device or may be stored in separate storage devices.

The background information 131 is an image serving as a reference for comparison with a captured image by the first change detection part 120. The background information 131 is also referred to as a background image. It is preferable that the background information 131 is, for example, an image of the same type as a captured image. In this example embodiment, a captured image is an RGB image as stated above. Therefore, it is preferable that the background information 131 is also an RGB image. The background information 131 may be a captured image first provided from the first acquisition part 110 to the first change detection part, or may be an image given beforehand.

Further, as will be described later, the background information 131 is information that can be updated. The details of the process of updating the background information 131 will be described later.

The shelf change model 132 is obtained by modeling a change of the store shelf 3 learned beforehand. The shelf change model 132 is, for example, stored in the storage unit 130 in advance. The shelf change model 132 may be, for example, obtained by learning with machine learning such as Convolutional Neural Network broadly known in general.

For example, the shelf change model 132 represents "a change due to no product being included in the store shelf 3" or "a change due to a new product being included in the store shelf 3" learned using an image in which an product is included in the store shelf 3 and an image in which no product is included in the store shelf 3. The shelf change model 132 also represents "a change due to a change of the look of an product displayed in the store shelf 3" learned using an image of a plurality of products and a plurality of images in which the shapes of the respective products have changed. The shelf change model 132 also represents "a change due to the presence of a person in front of the store shelf 3", "a change due to the presence of a shopping cart in front of the store shelf 3", and the like, learned using a captured image captured in a state that a target object is absent in front of the store shelf 3 and a captured image captured in a state that a target object such as a person is present in front of the store shelf 3. In addition, the shelf change model 132 may represent, for example, "a change due to a change of illumination" learned using an image under various circumstances.

The training data of the shelf change model 132 may be, for example, a six-channel image obtained by combining two RGB images before and after a change, or may be a two-channel image obtained by combining any one of the R components, the G components, and the B components of two RGB images before and after a change. The training data may also be, for example, a four-channel image obtained by combining any two of the R components, the G components, and the B components of two RGB images before and after a change, or a two-channel image obtained by converting two RGB images before and after a change into gray scale images and combining the two images. The training data may also be an image obtained by converting RGB images before and after a change into another color space such as an HSV (Hue Saturation Value) color space and combining one or a plurality of channels in the color space after the conversion into the other color space.

Further, the training data of the shelf change model 132 may be generated from a color image such as an RGB image, or generated using both a color image and a range image.

The foreground information 133 is information stored by the foreground region detection part 121. The foreground information 133 includes information representing a foreground region (a change region) that is a region different from a background image of an RGB image, detected as a result that the foreground region detection part 121 compares the background information 131 that is the background image with the RGB image that is a captured image. To be specific, for example, the foreground information 133 is a binary image associated with the capture time of the captured image. The details of the process of storing the foreground information 133 will be described later.

The person information 134 is information stored by a foreground region tracking part 123. The person information 134 is generated by, for example, associating the ID of an imaging device (a camera ID), a person ID, a location on a captured image, the capture time of a captured image, and so on, with a person region extracted by the foreground region tracking part 123. As will be described later, the person region is, for example, an RGB image. In other words, for example, the person information 134 can include information representing the color, area and shape of a stored person region and the aspect ratio of a bounding rectangle of the stored person region. The details of the process of storing the person information 134 will also be described later.

The first change detection part 120 detects a change region relating to the store shelf 3.

For example, in a case where an product displayed in the store shelf 3 included in a captured image is not included in an image (e.g., a background image) acquired before the captured image, the first change detection part 120 detects the region of the product. Moreover, for example, in a case where an product displayed in the store shelf 3 included in a background image is not included in a captured image, the first change detection part 120 detects the region of the product. Moreover, for example, in a case where the look of an product displayed in the store shelf 3 included in a captured image is different from the look of an product included in a background image, the first change detection part 120 detects the region of the product. Thus, the first change detection part 120 detects, based on a captured image, a change in display status of merchandise, for example, products have decreased (products have disappeared), products have increased (a new product has appeared), or the look of an product has changed.

Further, for example, in a case where a captured image is captured when a person or an object is present between the store shelf 3 and the imaging device 2, the first change detection part 120 detects the region of the person or the object included in the captured image obtained by capturing the store shelf 3.

As described above, the first change detection part 120 detects a change region inside the store shelf 3 that is a region where the display status of merchandise has changed, and a change region relating to the store shelf 3 such as a change region in a captured image due to a person or an object between the store shelf 3 and the imaging device 2.

As shown in FIG. 4, the first change detection part 120 includes the foreground region detection part 121, a background information update part 122 (a background information updating unit), the foreground region tracking part 123, a first extraction part 124, a second extraction part 125, and the region change classification part 126.

The foreground region detection part 121 receives a captured image provided from the first acquisition part 110. The foreground region detection part 121 also acquires the background information 131 corresponding to the captured image from the first storage part 130. As stated above, the background information 131 is an RGB image. The foreground region detection part 121 compares the captured image with the background information 131, which are two RGB images. Then, the foreground region detection part 121 detects a region with a change between the two RGB images having been compared, as a change region. It can also be said that the foreground region detection part 121 detects a foreground region that is a different region from a background region because it compares the background information 131 of a background image with the RGB image of a captured image.

In this example embodiment, a method by which the foreground region detection part 121 detects a change region is not specifically limited. The foreground region detection part 121 can be configured to detect a change region by an existing technique. For example, the foreground region detection part 121 may detect a change region by the background subtraction method disclosed in Non-Patent Document 1. The foreground detection part 121 may generate a binary image in which the values of pixels in a detected change region are 255 and the values of pixels in the remaining region are 0.

Figure 5A:
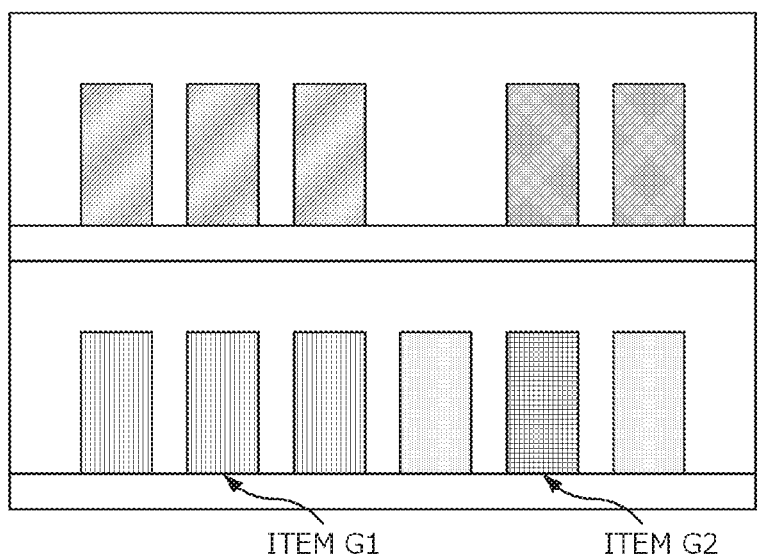
FIG. 5a is a view for describing the operation of a foreground region detection part.
Figure 5B:
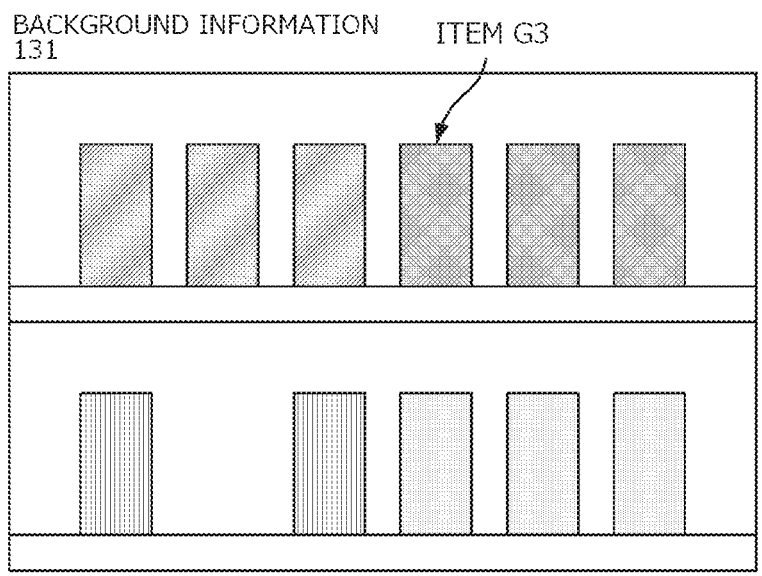
FIG. 5b is a view for describing the operation of a foreground region detection part.
Figure 5C:
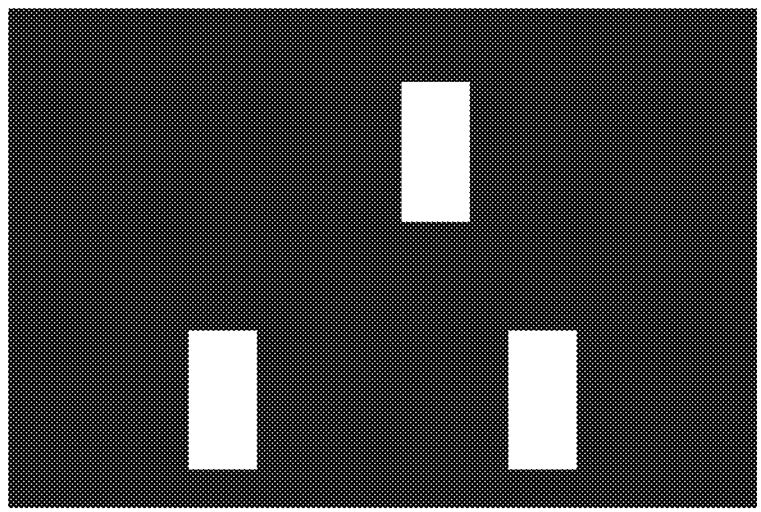
FIG. 5c is a view for describing the operation of a foreground region detection part.

An example of the operation of the foreground region detection part 121 will be described in more detail referring to FIG. 5. FIG. 5 is a view for describing the operation of the foreground region detection part 121. FIG. 5A shows an example of a captured image, and FIG. 5B shows an example of the background information 131 corresponding to the captured image stored in the first storage part 130. Moreover, FIG. 5C is a view showing an example of a binary image that is the result of detection of a change region.

Referring to FIGS. 5A and 5B, there are differences in three regions of an product G1, an product G2 and an product G3 between the captured image and the background information 131. For example, in the case of FIGS. 5A and 5B, the product G1 is not included in the background information 131, but is included in the captured image. The product G3 is included in the background information 131, but is not included in the captured image. Moreover, in the location of the product G2 included in the captured image, a different product is displayed on the background information 131. Therefore, the foreground region detection part 121 also detects the region of the product G2 as a region with a change. In such a case, the foreground region detection part 121 generates a binary image in which portions corresponding to the regions of the products G1, G2 and G3 are expressed in white and the remaining portion is expressed in black as shown in FIG. 5C, for example.

In the following description, a change region represents each of the white portions in FIG. 5C. That is, a change region is, for example, a set of pixels each having a pixel value of 255 and each adjacent to a pixel having a pixel value of 255. The foreground region detection part 121 detects three change regions in the example of FIG. 5C.

For example, as stated above, the foreground region detection part 121 generates a binary image of the same size as the captured image. Moreover, the foreground region detection part 121 associates the binary image of the detection result with the capture time of the captured image used for generation of this binary image. The foreground region detection part 121 may associate, with the binary image, information representing the captured image used for generation of this binary image, information representing the background information 131, or the like. Then, the foreground region detection part 121 provides the detection result with which the capture time of the captured image or the like is associated to the background information update part 122 and the foreground region tracking part 123. Moreover, the foreground region detection part 121 stores the detection result with which the capture time of the captured image is associated, as the foreground information 133 into the first storage part 130.

It is sufficient that the result of detection by the foreground region detection part 121 includes information representing the detected change region. For example, the foreground region detection part 121 may associate information representing the location of the detected change region (a region in which the values of pixels are 255) and the size thereof with information representing a captured image used for detecting the change region and information representing a background image, and output as the detection result. Thus, the detection result output by the foreground region detection part 121 may be in any format.

Further, the foreground region detection part 121 may associate the capture time of a captured image with a binary image serving as a detection result, and may also associate color information included in a change region extracted from the captured image with the binary image. The foreground region detection part 121 may associate, instead of color information of a change region, an image of a change region with the detection result. Thus, the foreground region detection part 121 may also associate information other than the capture time with the detection result.

Further, as in the case of FIG. 5C, there is a case where a binary image generated by the foreground region detection part 121 includes a plurality of change regions. In such a case, the foreground region detection part 121 may generate a binary image for each of the change regions. A method by which the foreground region detection part 121 generates a binary image for each change region will be described later as a modification example of the foreground region detection part 121.

The foreground region tracking part 123 tracks a change region detected by the foreground region detection part 121 through a plurality of captured images. Based on the result of tracking, the foreground region tracking part 123 provides a binary image to the first extraction part 124 and the second extraction part 125 and extracts a person region. The foreground region tracking part 123 also provides an update signal indicating update of the background information 131 to the background information update part 122.

For example, the foreground region tracking part 123 receives a detection result (a binary image) provided from the foreground region detection part 121. The foreground region tracking part 123 also acquires, from the first storage part 130, the foreground information 133 that is a binary image generated from a captured image captured before the capture time of a captured image relating to the binary image of the detection result that is associated with the binary image. Then, the foreground region tracking part 123 by executing a process of making the change regions represented by the binary images correspond to each other, thereby tracking the change regions.

The foreground region tracking part 123 can track change regions by various methods. For example, the foreground region tracking part 123 calculates the degree of similarity based on at least one of the areas, shapes, and aspect ratios of bounding rectangles of change regions represented by the binary images provided from the foreground region detection part 121 and by the foreground information 133 acquired from the first storage part 130. Then, the foreground region tracking part 123 tracks change regions by making change regions with the highest calculated degree of similarity correspond to each other. Moreover, in a case where the foreground region tracking part 123 is configured to associate color information with a detection result, the foreground region tracking part 123 may track using the color information. The foreground region tracking part 123 may track based on an image of a change region associated with a detection result.

The foreground region tracking part 123 checks whether the result of tracking is equal to or more than a predetermined time (any time may be set), and checks whether the movement amount of a change region is equal to or more than a predetermined threshold value (any value may be set).

In a case where the movement amount of a change region is less than the predetermined threshold value and the result of tracking is equal to or more than the predetermined time, the foreground region tracking part 123 provides a binary image that is a detection result provided from the foreground region detection part 121 to the first extraction part 124 and the second extraction part 125. At this time, the foreground region tracking part 123, for example, applies information showing a captured image used for generation of a binary image and information showing the background information 131 to the binary image, and provides this binary image to the first extraction part 124 and the second extraction part 125. The foreground region tracking part 123 may provide, for example, the binary image and also the corresponding captured image and the background information 131, to the first extraction part 124 and the second extraction part 125. Moreover, in a case where the binary image includes a plurality of change regions and any of the change regions has not been tracked for a predetermined time or more, the foreground region tracking part 123 may provide the binary image together with information showing a change region tracked for the predetermined time or more to the first extraction part 124 and the second extraction part 125.

In a case where the binary image includes a plurality of change regions, the foreground region tracking part 123 may generate a plurality of binary images so that one binary image includes one change region. For example, the foreground region tracking part 123 may provide a binary image including only a change region tracked for a predetermined time or more to the first extraction part 124 and the second extraction part 125, whereas discard a binary image including a change region not tracked for the predetermined time or more. Meanwhile, the foreground region tracking part 123 may receive a binary image for each change region as a detection result from the foreground region detection part 121.

Further, in a case where the movement amount of a change region is equal to or more than the predetermined threshold value, the foreground region tracking part 123 determines that an object included in the change region is a moving object. In the case of thus determining that an object included in the change region is a moving object, the foreground region tracking part 123 does not provide this change region to either the first extraction part 124 or the second extraction part 125. With this, the image processing device 100 can eliminate a change relating to the store shelf 3 irrelevant to increase/decrease of merchandise, such as "a change due to the presence of a person in front of the store shelf 3". Consequently, it is possible to more accurately monitor the display status of merchandise.

The foreground region tracking part 123 may associate a determination result that an object included in a change region is a moving object with the change region, and provide to the first extraction part 124 and the second extraction part 125. In a case where the determination result is associated with the change region, the region change classification part 126 may classify a change relating to the store shelf 3 in this change region into a type relating to a change of an object other than merchandise displayed on the store shelf 3. For example, the region change classification part 126 may classify a change relating to the store shelf 3 in a change region into a type relating to a change of an object other than merchandise, such as "a change due to the presence of a person in front of the store shelf 3" or "a change due to the presence of a shopping cart in front of the store shelf 3".

The foreground region tracking part 123 extracts a change region determined to be a moving object as a person region from a captured image. To be specific, the foreground region tracking part 123 uses a captured image and a binary image having the same size as the captured image, thereby extracting, as a first noted image, an image of a region on the captured image corresponding to a region with pixel values of 255 in the binary image. As stated above, a captured image is an RGB image. Therefore, the extracted person region is also an RGB image.

The foreground region tracking part 123 may, for each change region determined to be a moving object, extract a person region that is a region having the same shape as the change region, or may extract a region surrounded by a frame having the same shape as a frame with a predetermined shape circumscribing the change region, as a person region. The shape of the frame circumscribing the change region may be any shape, for example, a rectangle, an ellipse, or the like. Moreover, the foreground region tracking part 123 may extract, as a person region, a region surrounded by a frame that is larger by a predetermined size than a frame circumscribing a change region.

Next, the foreground region tracking part 123 associates the ID (camera ID) of the imaging device 2, a person ID applied to, for example, each extracted person region, a location on the captured image, the capture time of the captured image, and so on, with the extracted person region. Then, the foreground region tracking part 123 stores the associated information as the person information 134 into the first storage part. For example, the location on the captured image may be the coordinate values of the four corners of the bounding rectangle of the change region determined to be a moving object, or may be expressed with the coordinate values of at least one of the four corners and the width and height of the bounding rectangle.

Further, the foreground region tracking part 123 provides an update signal indicating update of the background information 131 to the background information update part 122.

For example, in the case of tracking a change region and thereafter providing a detection result showing the change region to the first extraction part 124 and the second extraction part 125, the foreground region tracking part 123 provides an update signal with value of 1 together with information showing the change region to the background information update part 122. The update signal with value of 1 indicates updating an image of a portion corresponding to the change region in the background information 131. In the case of not providing the detection result to either the first extraction part 124 or the second extraction part 125, the foreground region tracking part 123 may provide an update signal with value of 0 together with the information showing the change region to the background information update part 122. The update signal with value of 0 indicates not updating an image of a portion corresponding to the change region in the background information 131. A case of not outputting the detection result to either the first extraction part 124 or the second extraction part 125 is, for example, a case where a tracking result is less than a predetermined time, or a case where the movement amount of a change region is equal to or more than a predetermined threshold value.

The foreground region tracking part 123 may provide an update signal indicating update of the background information 131 to the background information update part 122 at any timing other than illustrated above. For example, the foreground region tracking part 123 may output an update signal with value of 1 so that the background of the store shelf 3 is updated, in a case where it is determined that there is a high possibility that an product included in a change region has been purchased or refilled based on product-purchased information or product-purchasing information, work information of store clerks, and so on, transmitted from a device outside the image processing device 100. The foreground region tracking part 123 may provide an update signal indicating update of the background information 131 to the background information update part 122 based on a tracking time included in the result of tracking, or the like.

The background information update part 122 updates the background information 131 based on a captured image provided from the first acquisition part 110, a detection result provided from the foreground region detection part 121, an RGB image that is the background information 131 stored in the first storage part 130, and an update signal provided from the foreground region tracking part 123. A method by which the background information update part 122 updates the background information 131 is not specifically limited and, for example, the same method as in Non-Patent Document 1 may be employed.

The background information update part 122 may not update, for example, an image of a portion corresponding to a change region shown by the detection result provided from the foreground region detection part 121, of the RGB image shown by the background information 131. For example, when receiving the update signal with value of 0 described above from the foreground region tracking part 123, the background information update part 122 does not update background information of a region corresponding to a change region.

As stated above, in the case of not outputting the detection result to either the first extraction part 124 or the second extraction part 125, the foreground region tracking part 123 provides the update signal with value of 0 to the background information update part 122. When the tracking result thus satisfies a first given condition, the background information update part 122 receives the update signal with value of 0 and does not update background information of the region corresponding to the change region. In other words, when the tracking result satisfies the first given condition, the background information update part 12 updates the background information 131 except a region corresponding to the change region. Consequently, a region corresponding to a region having not been updated in a captured image next acquired by the first acquisition part 110 is easily detected as a change region by the foreground region detection part 123.

Further, for example, when the value of an update signal provided from the foreground region tracking part 123 is 1, the background information update part 122 updates an image of a portion corresponding to a change region shown by a detection result provided from the foreground region detection part 121, in an RGB image shown by the background information 131. As stated above, in a case where a tracking result is equal to or more than a predetermined time, the foreground region tracking part 123 provides a detection result showing a tracked change region to the first extraction part 124 and the second extraction part 125, and also provides an update signal with value of 1 to the background information update part 122. That is, in a case where a tracking result satisfies a second given condition that it is the result of tracking for a predetermined time or more, the background information update part 122 receives an update signal with value of 1 from the foreground region tracking part 123, and updates an image of a portion corresponding to the change region in the background information 131. With this, the background information update part 122 can make the background information 131 stored in the first storage part 130 close to a captured image acquired by the first acquisition part 110 at the moment. Therefore, the image processing device 100 can prevent the foreground region detection part 121 from detecting a region on a captured image next acquired by the first acquisition part 110 corresponding to the above change region, as a change region.

The first extraction part 124 receives a binary image that is a detection result from the foreground region tracking part 123. The first extraction part 124 also acquires a captured image used for generation of the binary image from the first acquisition part 110. Meanwhile, the first extraction part 124 may receive the captured image together with the binary image from the foreground region tracking part 123.

The first extraction part 124 extracts an image of a change region from a captured image. To be specific, the first extraction part 124 uses a captured image and a binary image having the same size as the captured image, thereby extracting an image of a region on the captured image corresponding to a region with pixel values of 255 in the binary image, as a first noted image. For example, in a case where the binary image is as shown in FIG. 5C, the first extraction part 124 extracts three first noted images from the captured image. As stated above, since the captured image is an RGB image, the extracted first noted image is also an RGB image.

The first extraction part 124 may extract, for each change region, a first noted image of a region having the same shape as the change region, or may extract, as a first noted image, an image of a region surrounded by a frame having the same shape as a frame having a predetermined shape circumscribing the change region. The shape of a frame circumscribing a change region may be any shape, for example, a rectangle, an ellipse, and so on. The first extraction part 124 may extract, as a first noted image, an image of a region surrounded by a frame that is larger by a predetermined size than a frame circumscribing a change region.

The first extraction part 124 provides the extracted first noted image to the region change classification part 126. A region on a captured image of a first noted image extracted by the first extraction part 124 is also referred to as a first noted region. Moreover, the first extraction part 124 acquires location information of the first noted region, associates the location information with capture time, and provides them to the first association generation part 140. The location information of the first noted region may be the coordinate values of the four corners of a bounding rectangle of the first noted region, or may be expressed with the coordinate values of at least one of the four corners and the width and height of the bounding rectangle. In a case where the bounding rectangle is a circle, the location information may be, for example, the central coordinates of the circle and the radius of the circle. In a case where the bounding rectangle is an ellipse, the location information may be, for example, the central coordinates of the ellipse and the major axis and minor axis of the ellipse.

The second extraction part 125 receives a binary image that is a detection result from the foreground region tracking part 123. The second extraction part 125 also acquires the background information 131 used for generation of the binary image from the first storage part 130. The second extraction part 125 may receive the background information 131 together with the binary image from the foreground region tracking part 121.

The second extraction part 125 extracts an image of a change region from the background information 131. To be specific, the second extraction part 125 uses the background information 131 that is a background image and the binary image, thereby extracting an image of a region on the background information 131 corresponding to a region with pixel values of 255 in the binary image, as a second noted image. A method for extracting the second noted image is the same as the method for extracting the first noted image. The second extraction part 125 provides the extracted second noted image to the region change classification part 126. A region on the background information 131 of the second noted image extracted by the second extraction part 125 will also be referred to as a second noted region.

The region change classification part 126 classifies a change relating to the store shelf 3 in a change region, and provides a classification result to the first association generation part 140. The region change classification part 126 classifies a change from the status of an image of a region corresponding to a detected change region on a background image to the status of an image of a region corresponding to a change region on a captured image, based on the first noted region and the second noted region provided from the first extraction part 124 and the second extraction part 125 and on the shelf change model 132 stored in the first storage part 130. The status of an image is, for example, a state where an product is included or not included in the image, a state where a customer is included or not included in the image, a state where a shopping basket is included or not included in the image, a state where a shopping cart is included or not included in the image, and so on. The region change classification part 126 classifies, based on the shelf change model 132, a change relating to the store shelf 3 in a change region into change types such as "a change due to no product being included in the store shelf 3", "a change due to a new product being included in the store shelf 3", "a change due to a change of the look of an product displayed in the store shelf 3", "a change due to the presence of a person in front of the store shelf 3", "a change due to the presence of a shopping cart in front of the store shelf 3", and "a change due to a change of illumination". Meanwhile, the types of a status change in a change region classified by the region change classification part 126 are merely examples, and not limited to the above ones. Moreover, for example, "a change due to a change of the look of an product displayed in the store shelf 3" may be divided in more detail into "a change of the look due to the product being replaced with a different one" and "a change of the look due to change of the posture of the product".

Describing in more detail, the region change classification part 126 receives a first noted image from the first extraction part 124. Moreover, the region change classification part 126 receives a second noted image from the second extraction part 125. Then, the region change classification part 126 classifies a change from the status of the second noted image to the status of the first noted image corresponding to the second noted image into the abovementioned types, based on the shelf change model 132 stored in the first storage part 130. In other words, the region change classification part 126 classifies a change from the status of the second noted image to the status of the first noted image based on the result of comparison with the shelf change model 132.

FIG. 6 is a view showing an example of a classification result output by the region change classification part 126. The region change classification part 126 outputs, for example, a classification result 90 as shown in FIG. 6.

As shown in FIG. 6, the classification result 90 includes, for example, a second noted image 91, a first noted image 92, and a change type 93. The classification result 90 shown in FIG. 6 is an example, and the classification result 90 may include information other than the information shown in FIG. 6. For example, the classification result 90 may include information (identifier, capture time, and so on) relating to a captured image, information showing a location in the captured image of the first noted image 92, and so on.

Meanwhile, the region change classification part 126 may use, for example, a machine learning technique by which the shelf change model 132 has been created (Convolutional Neural Network, or the like), thereby classifying a change relating to the store shelf 3 into any of the abovementioned types.

The above is an example of the configuration of the first change detection part 120.

The first association generation part 140 receives the result of classification of a change region and location information of the change region from the first change detection part 120. The first association generation part 140 also acquires the person information 134 from the first storage part 130. Then, based on the capture time of the change region associated with the location information of the change region and on the capture time of a person associated with the person information 134, the first association generation part 140 generates product-person association information that shows the relation between an product corresponding to the change region (a change in display status of the product) and the person. After that, the first association generation part 140 provides the generated product-person association information to the association integration part 150.

To be specific, for example, the first association generation part 140 extracts persons crossing a change region from among persons captured at time before the capture time when the change region has been detected. Then, the first association generation part 140 associates the change region with a person captured at the closest time to the capture time of the change region of the extracted persons.

FIG. 7 shows an example of the product-person association information generated by the first association generation part 140. FIG. 7 illustrates a camera ID representing the ID of an imaging device, a person ID representing a person captured by the imaging device, location information of a change region of a store shelf, and the result of classification of a change. In FIG. 7, location information of a change region is expressed with the coordinate values of one corner of a bounding rectangle of the change region and the width and height of the bounding rectangle. The type of change represents "a change due to no product being included in the store shelf 3" to be "decrease of products", and "a change due to a new product being included in the store shelf 3" to be "increase of products".

Meanwhile, the first association generation part 140 may, for example, associate the generated product-person association information with the person information 134 stored in the first storage part 130 and provide them to the association integration part 150. Moreover, the first association generation part 140 may apply information relating to the captured image (an identifier, capture time, and so on) to the association information.

The association integration part 150 receives pieces of product-person association information from the first association generation part 140. Then, in a case where the received pieces of association information include pieces of association information of the same person, the association integration part 150 integrates them into one. After that, the association integration part 150 provides the integrated association information to the display detection part 160.

For example, the association integration part 150 calculates the degree of similarity based on at least one of the color, area, and shape of a person region stored in the person information 134 of the first storage part 130 and the aspect ratio of a bounding rectangle of the person region. Then, the association integration part 150 determines person regions whose calculated degrees of similarity are the highest to be the same person. As stated above, the association integration part 150 integrates pieces of association information determined to be the same person.

An example in which pieces of product-person association information shown in FIG. 7 are integrated is shown in FIG. 8. In the example shown in FIG. 8, association information with person ID 1 and association information with person ID 4 of FIG. 7 are integrated into one. Also, association information with person ID 2 and association information with person ID 3 of FIG. 7 are integrated into one. That is, FIG. 8 shows an example of a case where a person with person ID 1 and a person with person ID 4 of FIG. 7 are the same person and a person the person ID 2 and a person with person ID 3 of FIG. 7 are the same person. In FIG. 8, as one example of integration, at the time of integrating pieces of association information, two person IDs are compared, and a smaller person ID is adopted as the person ID of integrated association information. However, for example, a larger person ID may be adopted. Alternatively, for example, after integration of pieces of association information, a person ID may be newly applied.

The display detection part 160 receives integrated association information from the association integration part 150 and, based on the association information integrated by the association integration part 150, detects that an product is returned to a different place from a place where the product has been picked up. For example, the display detection part 160 compares a place where an product has been acquired with a place where the product is returned, thereby detecting that the product is returned to a different place from the place where the product has been picked up.

Referring to FIG. 8, the operation of the display detection part 160 will be specifically described. The display detection part 160 compares pieces of location information and change types for each person ID. For example, in the example shown in FIG. 7, the person with person ID 1 obtains an product from a place (10, 0) of a store shelf shown in an imaging device with camera ID 1, and returns an product to a place (250, 300). Regarding the obtained product and the returned product, the widths and heights of their bounding rectangles are (30, 50) both, and therefore, it is determined that these products are the same. With this, the display detection part 160 detects that the person with person ID 1 returns the product to a different place of the same shelf from a place where the person has obtained the product. In the example shown in FIG. 7, a person with person ID 2 returns an product to the same place as a place where the person has obtained the product. Therefore, the display detection part 160 does not detect this action to be that an product is returned to a different place from a place where the product has been picked up.

Thus, the display detection part 160, for example, detects that the same person returns the product to a different place, thereby detecting that the product is returned to a different place from a place where the product has been picked up. Meanwhile, for example, in a case where the look of an product changes even if the product is returned to the same place, the display detection part 160 detects that the product is returned to a different place from a place where the product has been picked up.

The above is an example of the respective components included by the image processing device 100.

Next, the flow of the operation of the image processing device 100 according to this example embodiment will be described referring to FIG. 9. FIG. 9 is a flowchart showing an example of the flow of the operation of the image processing device 100 according to this example embodiment.

Referring to FIG. 9, the first acquisition part 110 acquires a captured image that is an RGB image from a video signal obtained by capturing the store shelf 3 (step S1001). The first acquisition part 110 provides the captured image having been acquired to the first change detection part 120.

The foreground region detection part 121 of the first change detection part 120 uses the captured image that is an RGB image provided from the first acquisition part 110 and the background information 131 that is an RGB image stored in the first storage part 130, thereby detecting a region having changed between the two RGB images as a change region (a foreground region) (step S1002). Then, the foreground region detection part 121 provides the result of detection of the change region to the background information update part 122 and the foreground region tracking part 123. For example, the foreground region detection part 121 generates a binary image in which the values of pixels in the detected change region are 255 and the values of pixels in the remaining region are 0, and provides the binary image as the result of detection of the change region to the background information update part 122 and the foreground region tracking part 123.

Further, the foreground region detection part 121 stores the foreground information 133 into the first storage part 130 (step S1003). As stated above, the foreground information 133 is the result of detection with which capture time is associated.

The foreground region tracking part 123 tracks the change region based on the detection result provided from the foreground region detection part 121 and the foreground information 133 (step S1004). The foreground region tracking part 123 provides a binary image representing the change region tracked for a predetermined time or more to the first extraction part 124 and the second extraction part 125. The foreground region tracking part 123 provides an update signal indicating update of the background information 131 to the background information update part 122.

In a case where the movement amount of the change region is a predetermined threshold value or more as a result of tracking, the foreground region tracking part 123 determines that an object included in the change region is a moving object and extracts the determined change region as a person region. After that, the foreground region tracking part 123 associates predetermined information with the person region and stores as the person information 134 into the first storage part.

The background information update part 122 updates the background information 131 based on the captured image provided from the first acquisition part 110, the result of detection of the change region provided from the foreground region detection part 121, the background information 131, and the update signal provided from the foreground region tracking part 123 (step S1005). Meanwhile, step S1005 may be performed at any timing after step S1004.

The first extraction part 124 extracts, based on the captured image provided from the first acquisition part 110 and the detection result relating to the captured image provided from the foreground region tracking part 123, an image of a region (a first noted region) corresponding to the change region shown by the detection result on the captured image, as a first noted image (step S1006). The first extraction part 124 provides the extracted first noted image to the region change classification part 126.

The second extraction part 125 extracts, based on the detection result provided from the foreground region tracking part 123 and the background information 131 acquired from the first storage part 130 and used for obtaining the detection result, a second noted image from the background information 131 through the same operation as the first extraction part 124 does (step S1007). The second extraction part 125 provides the extracted second noted image to the region change classification part 126. Meanwhile, steps S1006 and S1007 may be performed at the same time or in inversed order.

Based on the first noted image provided from the first extraction part 124, the second noted image provided from the second extraction part 125, and the shelf change model 132 stored in the first storage part 130, the region change classification part 126 classifies a change relating to store shelf 3 (a change from a state in the second noted image to a state in the first noted image) (step S1008).

The first association generation part 140 receives the result of classification of the change region and location information of the change region from the region change classification part 126 of the first change detection part 120. The first association generation part 140 also acquires the person information 134 from the first storage part 130. Then, the first association generation part 140 extracts persons having crossed the change region from among persons captured at time before the capture time when the change region has been detected. After that, the first association generation part 140 associates a person captured at the closest time to the capture time of the change region from among the extracted persons (step S1009). Thus, the first association generation part 140 generates association information.

The association integration part 150 receives the product-person association information from the first association generation part 140 and, in a case where the received product-person association information includes pieces of association information of the same person, the association integration part 150 integrates them into one. For example, the association integration part 150 calculates the degree of similarity based on at least one of the color, area, shape, and aspect ratio of bounding rectangle of the person region stored in the person information 134 of the first storage part 130. Then, the association integration part 150 determines person regions whose calculated degrees of similarity are the highest to be the same person. After that, the association integration part 150 integrates the pieces of association information including the persons determined to be the same person into one (step S1010).

The display detection part 160 receives the integrated association information from the association integration part 150. Then, the display detection part 160, for example, compares a place where an product has been obtained with a place where the product is returned, thereby detecting that the product is returned to a different place from a place where the product has been picked up (step S1011). Moreover, for example, in a case where the look of an product changes, the display detection part 160 detects that the product is returned to a different place from a place where the product has been picked up.

The image processing device 100 determines whether or not the first acquisition part 110 receives a next video signal (whether or not a next captured image is present) (step S1012). In a case where a next captured image is present (YES at step S1012), the processing transits to step S1001. On the other hand, in a case where a next captured image is absent (NO at step S1012), the image processing device 100 ends the operation.

Thus, the image processing device 100 according to this example embodiment has the first change detection part 120, the first association generation part 140, the association integration part 150, and the display detection part 160. With such a configuration, the first change detection part 120 detects a change region relating to the store shelf 3 by comparing a captured image obtained by capturing a store shelf with the background information 131 representing an image captured before the capture time of the captured image. Then, based on the detected change region and the shelf change model 132 that is a model of a change relating to the store shelf 3 learned beforehand, the first change detection part classifies a change relating to the store shelf 3 in the change region. Moreover, the association information generation part 140 generates association information of a change relating to an product and a detected person. Then, the association integration part 150 integrates pieces of association information for each person. With this, the display detection part 160 can detect that an product is returned to a different place from a place where the product has been picked up, for example, an product is returned to a wrong place. That is, the above configuration allows for detecting that an product is returned to a different place from a place where the product has been picked up based on a captured image. In other words, the image processing device 100 allows for detecting that an product is returned to a different place from a place where the product has been picked up without using a means such as an RFID (radio frequency identifier) tag in addition to a captured image.

As stated above, the shelf change model 132 is a model showing a change relating to the store shelf 3. Therefore, the first change detection part 120 can classify changes relating to the store shelf 3 in regions detected as change regions into types, for example, a change due to an product being picked up from the store shelf 3, a change due to an product being refilled, and so on.

Therefore, the image processing device 100 according to this example embodiment can specify not only the presence of a change of an product in the store shelf 3 but also the type of the change. As a result, the image processing device 100 can more accurately determine the status of the store shelf 3, for example, a state where an product is picked up, a state where the store shelf 3 is replenished, and so on.

The image processing device 100 described in this example embodiment allows for recognizing whether an product displayed in the store shelf 3 is picked up, an product is returned to the store shelf 3, and so on, for each person based on such a classification result and the result of person detection. As a result, the image processing device 100 can detect that an product is returned to a different place from a place where the product has been picked up. If an product is returned to a different place from a place where the product has been picked up, for example, a refrigerated product is returned to a room-temperature shelf, the loss of sales opportunity, the loss due to product disposal and the like occur and seriously affect the sales of the store. Therefore, if such a case occurs, it is preferable to quickly perform a merchandise management operation in order to solve the case. As stated above, the image processing device 100 can detect that an product is returned to a different place from a place where the product has been picked up. As a result, the image processing device 100 can reduce occurrence of the loss of sales opportunity, the loss due to product disposal and the like, caused by that an product is returned to a different place from a place where the product has been picked up.

In this example embodiment, the imaging device 2 captures the store shelf 3. However, a target to be captured by the imaging device 2 is not limited to the store shelf 3. For example, the imaging device 2 may capture an image of products stacked in a wagon. That is, a captured image captured by the imaging device 2 may be a captured image obtained by capturing an image of products stacked in a wagon. The image processing device 100 can detect a change region by comparing the captured image obtained by capturing an image of the products stacked in the wagon with a background image. Thus, the image processing device 100 can use a captured image obtained by capturing an image of products displayed in various display manners, not limited to a store shelf in which products are displayed so that all the faces thereof can be seen.

Second Example Embodiment

Figure 10:
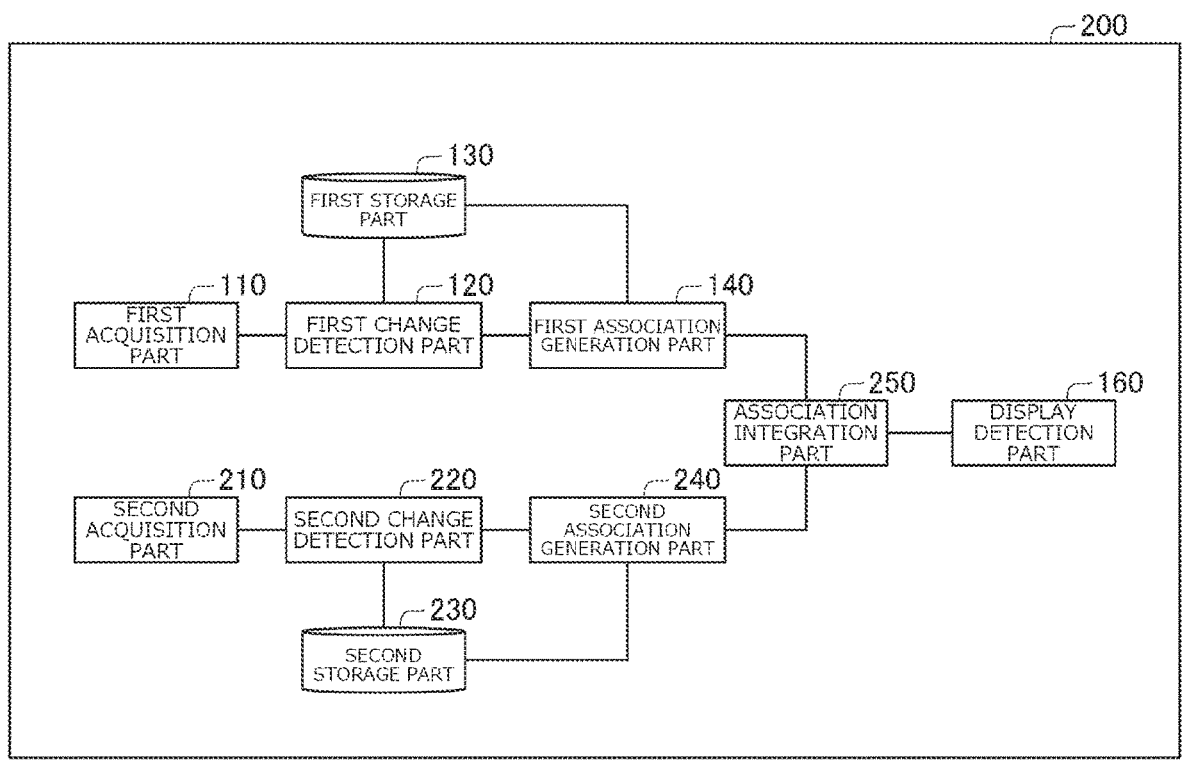
FIG. 10 is a function block diagram showing an example of the configuration of an image processing device according to a second example embodiment.
Figure 13:
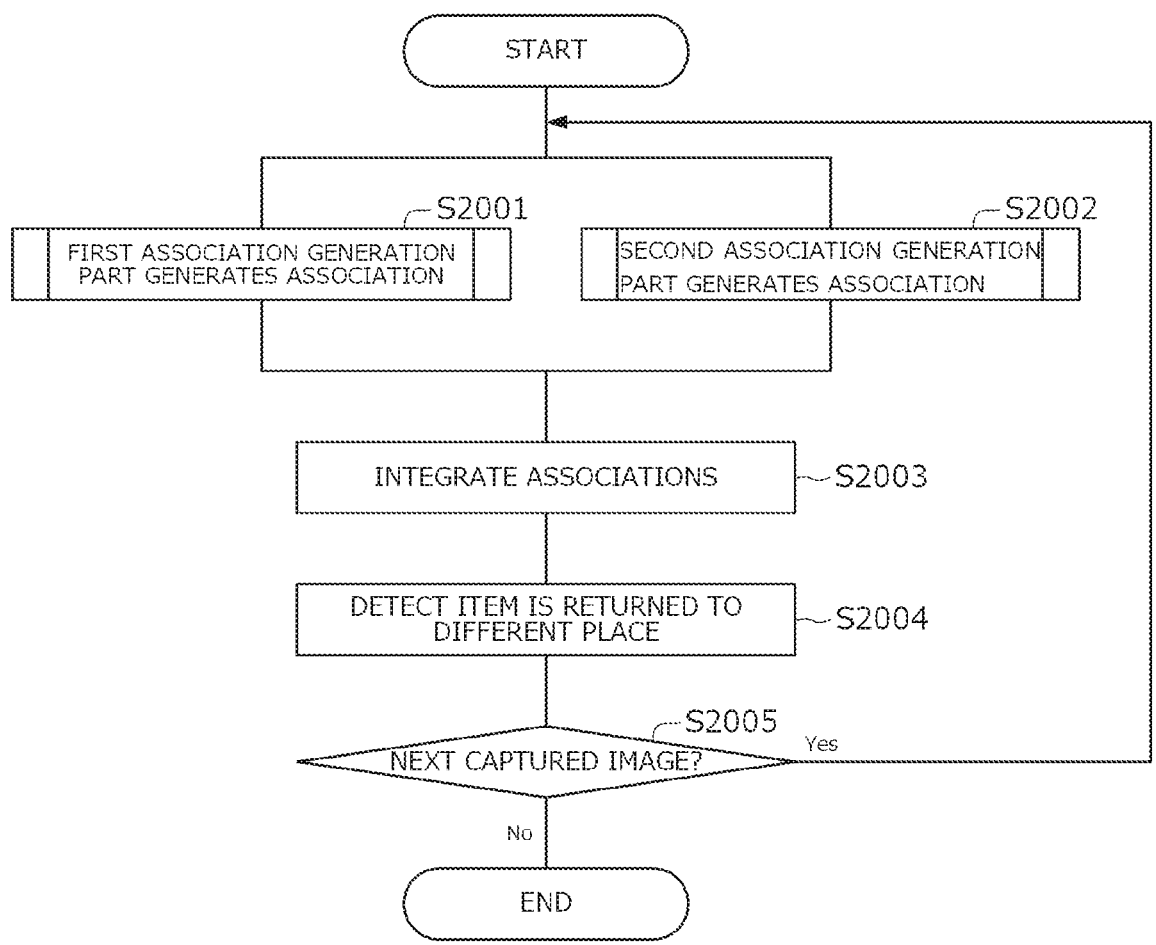
FIG. 13 is a flowchart showing an example of the flow of the operation of the image processing device according to the second example embodiment.

Next, referring to FIGS. 10 to 13, a second example embodiment will be described. FIG. 10 is a function block diagram showing an example of the configuration of an image processing device 200. FIG. 11 is a view showing an example of pieces of product-person association information generated by the first association generation part 140 and a second association generation part 150. FIG. 12 is a view showing an example in which the pieces of product-person association information are integrated. FIG. 13 is a flowchart showing an example of the flow of the operation of the image processing device 200.

In this example embodiment, the merchandise monitoring system 1 that monitors different store shelves 3 with a plurality of imaging devices 2 will be described. As will be described later, the image processing device 200 in this example embodiment detects that an product is returned to a different place from a place where the product has been picked up based on the result of monitoring the different store shelves 3. That is, the image processing device 200 described in this example embodiment allows for detecting that an product is returned to a different place from a place where the product has been picked up even when the store shelf 3 where the product has been obtained is different from the store shelf 3 where the product is returned.

The image processing device 200 in this example embodiment is communicably connected to the imaging device 2 like the image processing device 100 shown in FIG. 1 described in the first example embodiment.

FIG. 10 shows an example of the configuration of the image processing device 200. As shown in FIG. 10, the image processing device 200 according to this example embodiment includes the first acquisition part 110, a second acquisition part 210, the first change detection part 120, a second change detection part 220, the first storage part 130, a second storage part 230, the first association generation part 140, the second association generation part 240, an association integration part 250, and the display detection part 160. Thus, the image processing device 200 according to this example embodiment includes the association integration part 250 instead of the association integration part 150 of the image processing device 100. Besides, the image processing part 200 includes the second acquisition part 210, the second change detection part 220, the second storage part 230, and the second association generation part 240 in addition to the components included by the image processing device 100.

In the above description, the elements having the same functions as the elements included in the drawings described in the first example embodiment are denoted by the same reference numerals. Below, components that are characteristic to this example embodiment will be described.

The second acquisition part 210 acquires an RGB image through the same operation as the first acquisition part 110 does. Then, the second acquisition part 210 provides the RGB image to the second change detection part 220. For example, the second acquisition part 210 acquires a video signal from the imaging device 2 that monitors the different store shelf 3 from the imaging device 2 transmitting a video signal acquired by the first acquisition part 110.

The second storage part 230 is configured like the first storage part 130. Therefore, a detailed description thereof will be omitted. The second storage part 230 may be the same storage device as the first storage part 230, or a different storage device from the first storage part 230.

The second change detection part 220 is configured like the second change detection part 120. The second change detection part 220 detects a change region relating to the store shelf 3 through the same operation as the first change detection part 120 does. Then, based on the detected change region and the shelf change model 132 that is a model of a change relating to the store shelf 3 learned beforehand, the second change detection part 220 classifies a change relating to the stores shelf 3 in the change region. After that, the second change detection part 220 associates location information of the first noted region with capture time, and provides them to the second association generation part 240. Moreover, the second change detection part 220 provides the result of classification of the change relating to the store shelf 3 in the change region to the second association generation part 240.

The second association generation part 240 is configured like the first association generation part 140. The second association generation part 240 generates product-person association information through the same operation as the first association generation part. Then, the second association generation part 240 provides the generated association information to the association integration part 250.

FIG. 11 shows an example of pieces of product-person association information generated by the first association generation part 140 and the second association generation part 240. Like FIG. 6, FIG. 11 illustrates a camera ID representing the ID of an imaging device, a person ID representing a person shown in the imaging device, location information of a change region of a store shelf, and the result of classification of a change. In the illustration of FIG. 11, it is shown that a person with person ID 1 and a person with person ID 2 are captured by an imaging device with camera ID 1, and a person with person ID 3 and a person with person ID 4 are captured by an imaging device with camera ID 2. In the illustration of FIG. 11, for example, information with camera ID 1 is information generated by the first association generation part 140, and information with camera ID 2 is information generated by the second association generation part 240.

The association integration part 250 receives pieces of product-person association information from the first association generation part 140 and the second association generation part 240, respectively, and in a case where pieces of association information of the same person are present, integrates them into one. Then, the association integration part 250 provides the integrated association information to the display detection part 160. For example, the association integration part 250 integrates multiple pieces of association information through the same operation as the association integration part 150.

An example in which the pieces of product-person association information shown in FIG. 11 are integrated by the association integration part 250 is shown in FIG. 12. In the example shown in FIG. 12, the association information with person ID 1 and the association information with person ID 3 are integrated into one.

The display detection part 160 receives integrated association information from the association integration part 250 and, for example, compares a place where an product has been obtained with a place where the product is returned, thereby detecting that the product is returned to a different place from a place where the product has been picked up.

The operation of the display detection part 160 is as in the first example embodiment. For example, the display detection part 160 compares pieces of location information and the types of change for each person ID. To be specific, in the example shown in FIG. 12, the person with person ID 1 has obtained an product from a place (10, 0, 30, 50) of a store shelf shown in the imaging device with camera ID 1, and returns the product to a place (100, 250, 50, 70) of a store shelf shown in the imaging device with camera ID 2. With this, the display detection part 160 detects that the person with person ID 1 returns the product to a different shelf from a shelf where the person has obtained the product.

The components that are characteristic to the image processing device 200 are described above.

Next, the flow of the operation of the image processing device 200 according to this example embodiment will be described referring to FIG. 13. FIG. 13 is a flowchart showing an example of the flow of the operation of the image processing device 200 according to this example embodiment.

Referring to FIG. 13, the image processing device 200 executes the same processing as the processing at steps S1001 to S1009 shown in FIG. 9, and the first association generation part 140 thereby generates an association (step S2001). Likewise, the image processing device 200 executes the same processing as the processing at steps S1001 to S1009, and the second association generation part 240 thereby generates an association (step S2002). The processing at step S2001 and the processing at step S2002 may be executed in parallel, or either may be executed first.

The association integration part 250 receives pieces of product-person association information from the first association generation part 140 and the second association generation part 240, respectively. Then, in a case where pieces of product-person association information of the same person are present in those from the same imaging device 2 or in those from the multiple imaging devices 2, the association integration part 250 integrates them into one (step S2003). The association integration part 250 executes determination of the same person, for example, through the same operation as the association integration part 150.

The display detection part 160 detects that an product is returned to a different place from a place where the product has been picked up based on the association information received from the association integration part 150 (step S2004). The image processing device 200 determines whether or not the first acquisition part 110 or the second acquisition part 210 receives a next video signal (whether or not a next captured image is present) (step S2005). In a case where a next captured image is present (YES at step S2005), the processing transits to step S2001 or step S2002. On the other hand, in a case where a next captured image is absent (NO at step S2005), the image processing device 200 ends the operation.

The processing at steps S2004 and S2005 is the same processing as the processing at steps S1011 and S1012 of FIG. 9 described in the first example embodiment.

Thus, the image processing device 200 according to this example embodiment has the first association generation part 140 and the second association generation part 240. Moreover, the association integration part 250 integrates association information generated by the first association generation part 140 and association information generated by the second association generation part. That is, the association integration part 250 integrates pieces of product-person association information relating to the different store shelves 3 captured by the multiple imaging devices 2. As a result, the same effect as in the first example embodiment can be obtained and, moreover, even when a shelf from which a customer has obtained an product is different from a shelf to which the customer returns the product, the image processing device 200 can detect that the product is returned to a different place from a place where the product has been picked up. With this, it is possible to reduce the loss of sales opportunity, the loss due to product disposal, and the like, caused by inadequate merchandise display over a broader area in the store than in the first embodiment.

In the second example embodiment, a case has been described where the image processing device 200 has a first processing part that includes the first acquisition part 110, the first change detection part 120, the first storage part 130 and the first association generation part 140, and a second processing part that includes the second acquisition part 210, the second change detection part 220, the second storage part 230 and the second association generation part 240. That is, in the second example embodiment, a case where the image processing device 200 has the respective processing parts in pairs has been described. However, the number of each of the processing parts included by the image processing device 200 is not limited to two. For example, the image processing device 200 may have any number, which is three or more, of respective processing parts. In other words, the image processing device 200 may be configured to process captured images transmitted from any plural number, which is three or more, imaging devices 2 that monitor different shelves 3.

Third Example Embodiment

Figure 14:
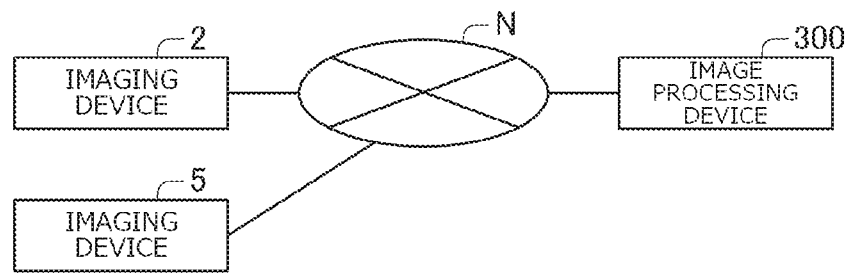
FIG. 14 is a view showing an example of the configuration of a merchandise monitoring system according to a third example embodiment.
Figure 15:
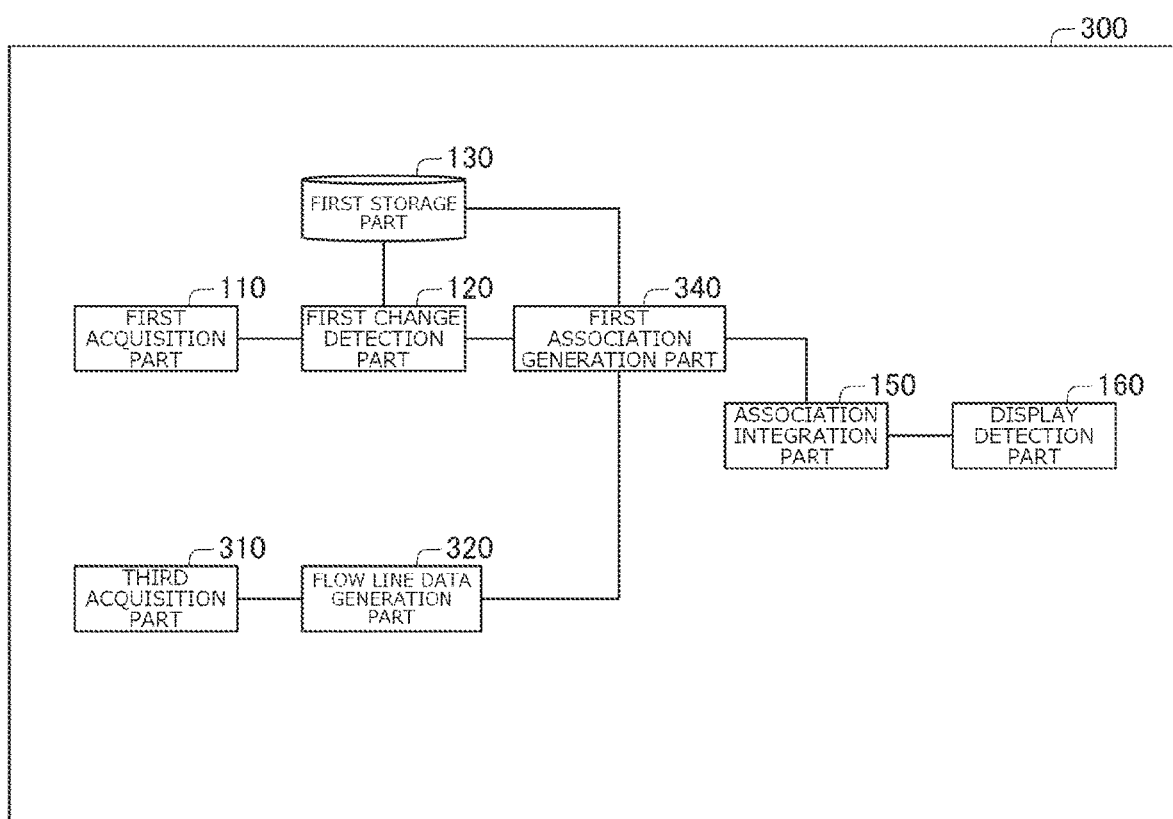
FIG. 15 is a function block diagram showing an example of the configuration of an information processing device according to the third example embodiment.
Figure 19:
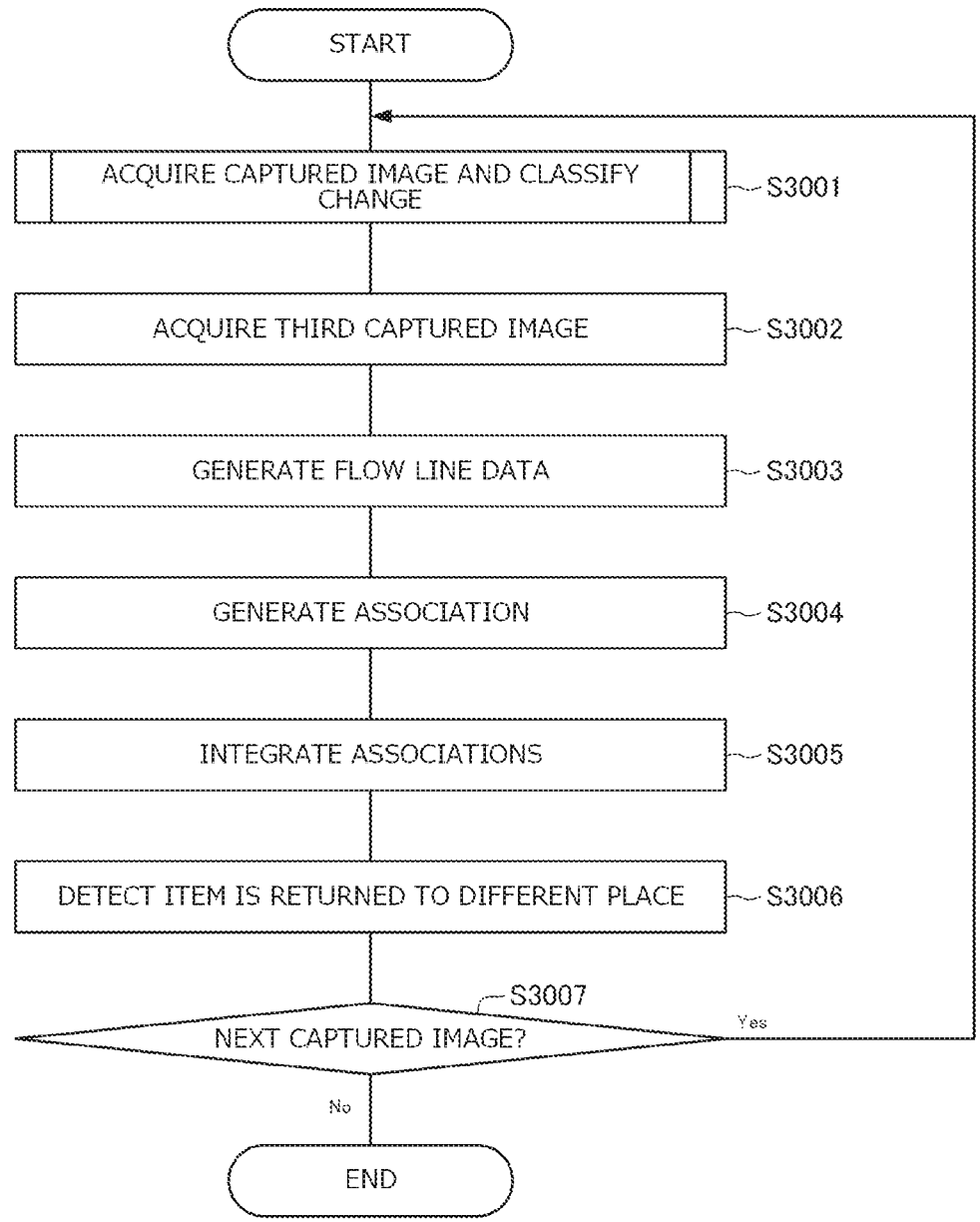
FIG. 19 is a flowchart showing an example of the flow of the operation of the image processing device according to the third example embodiment.

Next, referring to FIGS. 14 to 19, a third example embodiment will be described. FIG. 14 is a view showing an example of the configuration of a merchandise monitoring system 4. FIG. 15 is a function block diagram showing an example of the configuration of an image processing device 300. FIG. 16 is a view showing an example of tracking data. FIG. 17 is a view showing an example of pieces of product-person association information generated by a first association generation part 340. FIG. 18 is a view showing an example in which the pieces of person-product association information generated by the first association generation part 340 are integrated. FIG. 19 is a flowchart showing an example of the flow of the operation of the image processing device 300.

In this example embodiment, the image processing device 300 that has a component for generating the tracking data of a customer in addition to the components of the image processing device 100 described in the first example embodiment will be described. As will be described later, the image processing device 300 generates association information using the generated tracking data. This allows for detecting with more accuracy that an product is returned to a different place from a place where the product has been picked up.

Referring to FIG. 14, the merchandise monitoring system 4 in this example embodiment includes an imaging device 5 that captures an image of a passage in a store in the same manner as a general monitoring camera, in addition to the imaging device 2 that captures an image of the store shelf 3. Like the imaging device 2, the imaging device 5 is communicably connected to the image processing device 300 via a network N.

The imaging device 5 is, for example, a monitoring camera installed in a store or the like. The imaging device 5 is installed, for example, in a position where it can capture an image of each passage in a store. The configuration of the imaging device 5 may be the same as that of the imaging device 2.

The merchandise monitoring system 4 may have one imaging device 5, or may have a plurality of imaging devices 5. That is, the merchandise monitoring system 4 may be configured to capture an image of each passage in a store with one imaging device 5, or may be configured to capture an image of each passage in a store with a plurality of imaging devices 5. Moreover, in this example embodiment, the merchandise monitoring system 4 has the imaging device 5 that is different from the imaging device 2. However, the merchandise monitoring system 4 may be configured to, for example, acquire tracking data of a customer based on captured images captured by a plurality of imaging devices 2. That is, the merchandise monitoring system 4 may be configured to acquire tracking data of a customer based on captured images captured by a plurality of imaging devices 2 that capture the store shelf 3.

The image processing device 300 generates tracking data showing a customer's movement route in the store from an RGB image acquired by a third acquisition part 310. Then, the image processing device 300 generates product-person association information based on the generated tracking data and a change region of the store shelf 3.

FIG. 15 shows an example of the configuration of the image processing device 300. As shown in FIG. 15, the image processing device 300 according to this example embodiment includes the first acquisition part 110, the first change detection part 120, the first storage part 130, a first association generation part 340, a third acquisition part 310, a tracking data generation part 320, the association integration part 150, and the display detection part 160. Thus, the image processing device 300 according to this example embodiment includes the first association generation part 340 instead of the first association generation part 140 of the image processing device 100. Moreover, the image processing device 300 includes the third acquisition part 310 and the tracking data generation part 320 in addition to the components included by the image processing device 100.

In the above description, the elements having the same functions as the elements included in the drawings described in the first and second example embodiments are denoted by the same reference numerals. Below, components that are characteristic to this example embodiment will be described.

The third acquisition part 310, through the same operation as the first acquisition part 110, obtains an RGB image from the imaging device 5, and provides the RGB image to the tracking data generation part 320. The RGB image obtained by the third acquisition part 310 is an image of a passage in the store captured in the same manner as a general monitoring camera.

The tracking data generation part 320 generates tracking data of a person in the store using an RGB image captured by at least one imaging device 5. Tracking data generated by the tracking data generation part 320 is, for example, information including a person ID for identifying a customer and a store shelf ID that is an identifier of the store shelf 3 that the customer visits. A method by which the tracking data generation part 320 generates tracking data is not specifically limited. For example, the tracking data generation part 320 can generate tracking data using the method described in Patent Document 3. That is, the tracking data generation part 320 identifies a customer in a captured image, for example, by performing face recognition of persons and detecting persons from whom the same data can be obtained as the same person, or by extracting information showing a customer's feature such as clothes and detecting the same person. Moreover, the tracking data generation part 320 determines that a customer visits the store shelf 3 based on, for example, a fact that the customer stays for a given time in front of the store shelf 3, or a fact that the distance between the customer and the store shelf 3 is equal to or less than a predetermined distance. Then, the tracking data generation part 320 generates tracking data by associating a person ID for identifying the customer with a store shelf ID of the store shelf that the customer visits. Meanwhile, the tracking data generation part 320 may generate tracking data using a method other than the illustrated above.

FIG. 16 is a view showing an example of tracking data generated by the tracking data generation part 320. The tracking data shown in FIG. 16 includes a person ID representing a person, a store shelf ID representing a store shelf that the person visits, and a camera ID representing an imaging device capturing the store shelf. It can be known from FIG. 16 that three persons visit a store shelf A. Moreover, it can be known that a person with person ID 1 and a person with person ID 2 each visit the store shelf A two times. In the example shown in FIG. 16, for example, the persons visit the store shelf A in order from the top in chronological order. Moreover, for example, the store shelf IDs and the camera IDs may be associated in advance.

The tracking data generation part 320 generates tracking data as shown in FIG. 16, for example. Then, the tracking data generation part 320 associates the generated tracking data with time of captured images of the tracking data, and provides them to the first association generation part 340. In other words, the tracking data generation part 320 includes time at which each person in the tracking data visits the store shelve into the tracking data, and provides to the first association generation part 340.

The first association generation part 340 receives the result of classification of a change region and location information of the change region from the first change detection part 120. Also, the first association generation part 340 acquires tracking data from the tracking data generation part 320. Then, the first association generation part 340 generates product-person association information corresponding to the change region based on the capture time of the change region associated with the location information of the change region and on the capture time associated with the tracking data. After that, the first association generation part 340 provides the generated product-person association information to the association integration part 150.

To be specific, the first association generation part 340 associates a person visiting the store shelf at the closest time to the capture time of the change region in the tracking data generated at time before capture time at which the change region is detected.

FIG. 17 shows an example of the product-person association information generated by the first association generation part 340. FIG. 17 illustrates a camera ID representing the ID of an imaging device, a person ID representing a person shown in the imaging device, a store shelf ID representing a store shelf, location information of a change region of the store shelf, and the result of classification of a change.

Thus, the first association generation part 340 is configured to generate association information using tracking data instead of the person information 134. The first association generation part 340 may be configured to also use the person information 134 when generating association information.

The association integration part 150 receives product-person associations from the first association generation part 340 and, in a case where associations of the same person are present, integrates them into one. Then, the association integration part 150 provides the integrated association to the display detection part 160.

To be specific, the association integration part 150 integrates associations of the same person based on the person ID. An example of integration of product-person associations shown in FIG. 17 is shown in FIG. 18. In the example shown in FIG. 18, pieces of association information of the person with person ID 1 of FIG. 17 are integrated into one. Moreover, pieces of association information of the person with person ID 2 are also integrated into one.

The operation of the display detection part 160 is the same as described in the first and second example embodiments. Therefore, a description thereof will be omitted.

The above is an example of the components that are characteristic to the image processing device 300.

Next, the flow of the operation of the image processing device 300 according to this example embodiment will be described referring to FIG. 19. FIG. 19 is a flowchart showing an example of the flow of the operation of the image processing device 300 according to this example embodiment.

Referring to FIG. 19, the image processing device 300 executes the same processing as the processing at steps S1001 to S1008 shown in FIG. 9, and the region change classification part 126 thereby classifies a change (step S3001).

The third acquisition part 310 acquires a captured image that is an RGB image from a video signal obtained by capturing the passage in the store and transmitted from the imaging device 5 (step S3002). The third acquisition part 310 provides the acquired captured image to the tracking data generation part 320.

The tracking data generation part 320 generates tracking data of a person in the store using the RGB image captured by at least one imaging device (step S3003). Then, the tracking data generation part 320 associates the generated tracking data with time of the captured image of the tracking data, and provides them to the first association generation part 340.

The processing at steps S3002 and S3003 may be interchanged with the processing at step S3001 in execution order, or may be executed simultaneously.

The first association generation part 340 receives the result of classification of the change region and location information of the change region from the first change detection part 120. Also, the first association generation part 340 acquires tracking data from the tracking data generation part 320. Then, the first association generation part 340 generates product-person association information corresponding to the change region based on capture time of the change region associated with the location information of the change region and on capture time associated with the tracking data (step S3004). To be specific, the first association generation part 340 associates a person visiting the store shelf at the closest time to the capture time of the change region in the tracking data generated at time before capture time at which the change region is detected, with the change region. Then, the first association generation part 340 provides the generated product-person association information to the association integration part 150.

After that, the image processing device 300 executes processing at steps S3005 to S3007 that is the same processing as the processing at steps S1010 to S1012 shown in FIG. 9.

Thus, the image processing device 300 according to this example embodiment has the third acquisition part 310 and the tracking data generation part 320. With such a configuration, the flow data generation part 320 generates tracking data based on an RGB image provided from the third acquisition part 310. Then, the image processing device 300 generates product-person association information based on a change region detected from an RGB image obtained by capturing the store shelf 3 and a classification result obtained by classifying the change region and on tracking data generated from an RGB image obtained by capturing the passage in the store. In a captured image obtained by capturing the passage in the store to be used for generation of tracking data, the whole body of a person is captured. Therefore, it becomes easier to specify a person in a captured image than in an RGB image obtained by capturing the store shelf 3. That is, in the case of generating association information using tracking data as the image processing device 300 does, it can be expected to generate association information with higher accuracy than in the case of generating association information using the person information 134. Therefore, the image processing device 300 according to this example embodiment can integrate association information with higher accuracy than the image processing device 100 according to the first example embodiment. With this, the accuracy of detecting that an product is returned to a different place from a place where the product has been picked up increases, so that the image processing device 300 can further reduce the loss of sales opportunity, the loss due to product disposal, and the like, caused by inadequate merchandise display than the image processing device 100.

Fourth Example Embodiment

Figure 20:
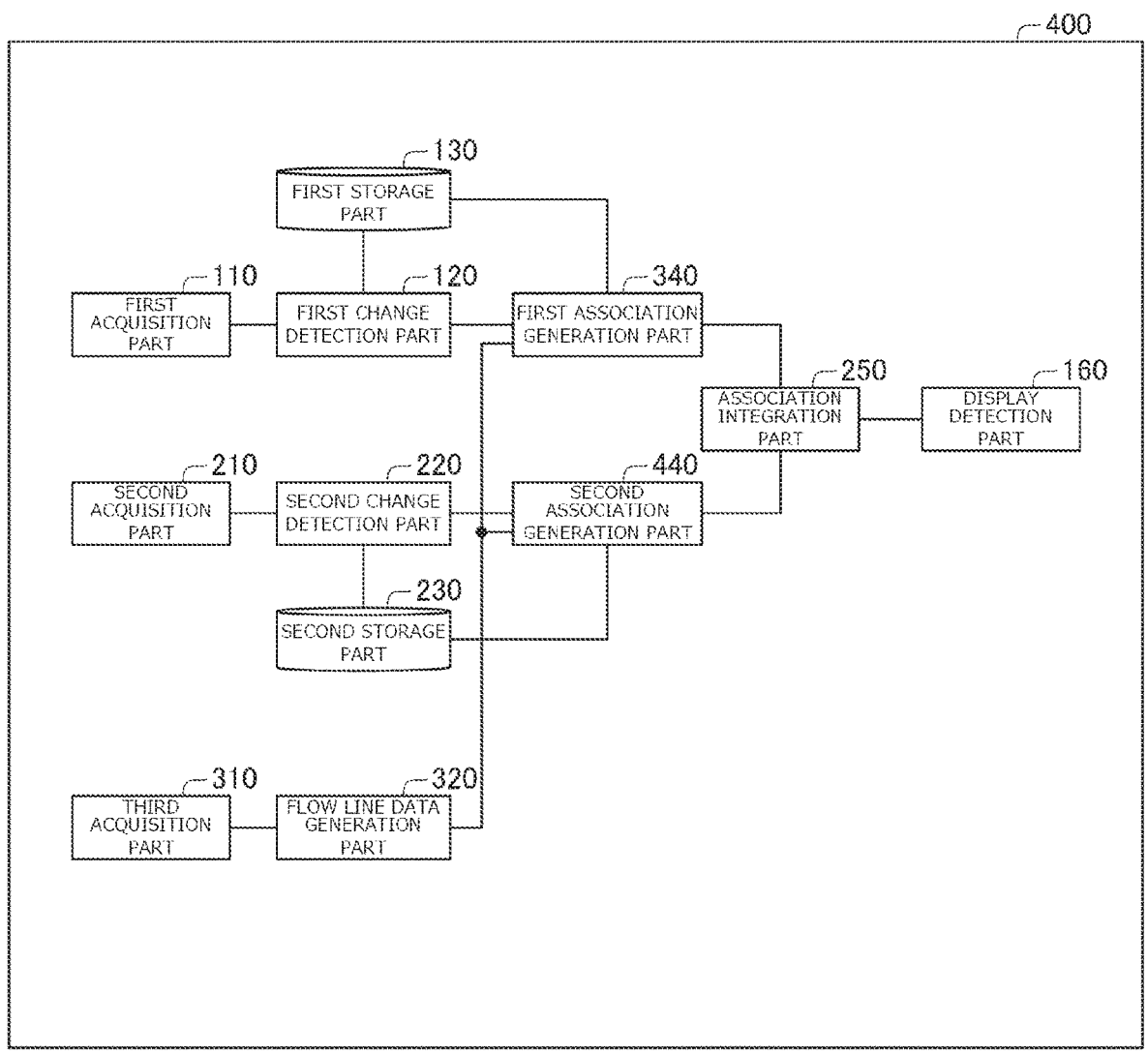
FIG. 20 is a function block diagram showing an example of the configuration of an image processing device according to a fourth example embodiment.
Figure 21:
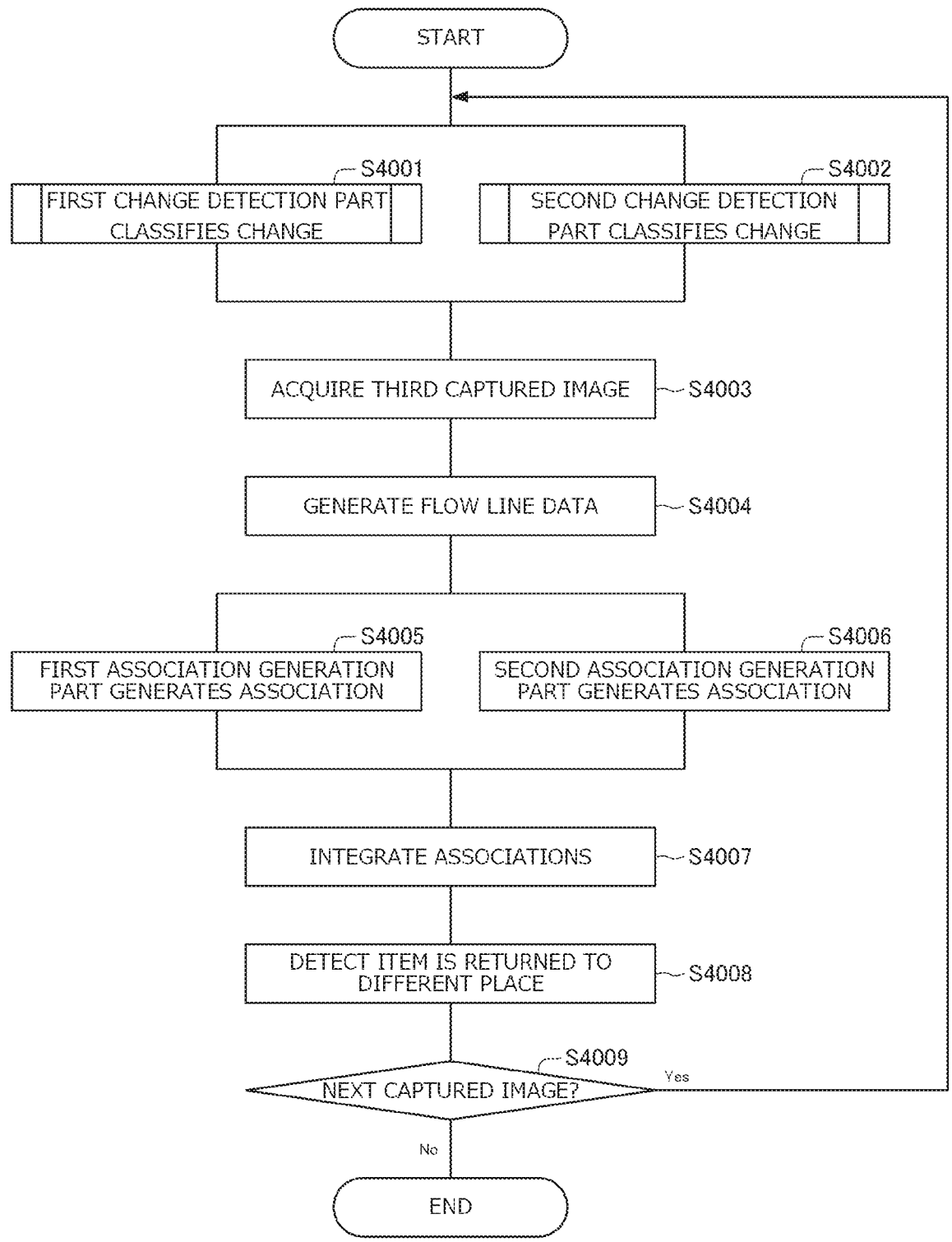
FIG. 21 is a flowchart showing an example of the flow of the operation of the image processing device according to the fourth example embodiment.

Next, referring to FIGS. 20 and 21, a fourth example embodiment will be described. FIG. 20 is a function block diagram showing an example of the configuration of an image processing device 400. FIG. 21 is a flowchart showing an example of the flow of the operation of the image processing device 400.

In this example embodiment, the image processing device 400 will be described that has the component for generating customer's tracking data described in the third example embodiment in addition to the components included by the image processing device 200 described in the second example embodiment. That is, in this example embodiment, a case will be described in which the components described in the second example embodiment and the components described in the third example embodiment are combined.

The image processing device 400 in this example embodiment is communicably connected to the imaging device 2 like the image processing device 100 shown in FIG. 1 described in the first example embodiment.

FIG. 20 shows an example of the configuration of the image processing device 400. As shown in FIG. 20, the image processing device 400 according to this example embodiment includes the first acquisition part 110, the second acquisition part 210, the first change detection part 120, the second change detection part 220, the first storage part 130, the second storage part 230, the first association generation part 340, a second association generation part 440, the third acquisition part 310, the tracking data generation part 320, the association integration part 250, and the display detection part 160. Thus, the image processing device 400 according to this example embodiment has the components included by the image processing device 200 described in the second example embodiment, and also includes the third acquisition part 310 and the tracking data generation part 320. In other words, the image processing device 400 according to this example embodiment includes the first association generation part 340 instead of the first association generation part 140 of the image processing device 200, and also includes the second association generation part 440 instead of the second association generation part 240. Besides, the image processing device 400 includes the third acquisition part 310 and the tracking data generation part 320.

In the above description, elements having the same functions as the elements included in the drawings described in the first, second, and third example embodiments are denoted by the same reference numerals. Below, a component that is characteristic to this example embodiment will be described.

The second association generation part 440 receives the result of classification of a change region and location information of the change region from the second change detection part 220. Also, the second association generation part 440 acquires tracking data from the tracking data generation part 320. Then, the second association generation part 440 generates product-person association information and provides the generated association information to the association integration part 250 through the same operation as the first association generation part 340.

Thus, the second association generation part 440 generates association information using tracking data as the first association generation part 340 does. Processing to be executed after the first association generation part 340 and the second association generation part 440 generate association information is the same as in the case described in the second example embodiment. Therefore, a detailed description thereof will be omitted.

The above is an example of the component that is characteristic to the image processing device 400.

Next, the flow of the operation of the image processing device 400 according to this example embodiment will be described referring to FIG. 21. FIG. 21 is a flowchart showing an example of the flow of the operation of the image processing device 400 according to this example embodiment.

Referring to FIG. 21, the image processing device 400 executes the same processing as the processing at steps S1001 to S1008 shown in FIG. 9, and the first change detection part 120 thereby classifies a change (step S4001). Likewise, the second change detection part 220 classifies a change (step S4002).

The third acquisition part 310 acquires a captured image that is an RGB image from a video signal obtained by capturing the passage in the store and transmitted from the imaging device 5 (step S4003). The third acquisition part 310 provides the acquired captured image to the tracking data generation part 320.

The tracking data generation part 320 generates tracking data of a person in the store using an RGB image captured by at least one imaging device (step S4004). Then, the tracking data generation part 320 associates the generated tracking data with time of the captured image of the tracking data, and provides them to the first association generation part 340.

The processing at of steps S4003 and S4004 are the same processing as the processing at steps S3002 and S3003 described in the third example embodiment. Moreover, the processing at steps S4003 and S4004 may be interchanged with the processing at S4001 and the processing at S4002 in execution order, or may be executed simultaneously.

The first association generation part 340 generates association information using the tracking data (step S4005). The second association generation part 440 also generates association information using the tracking data (step S4006).

The processing at step S4005 and the processing at step S4006 are the same processing as the processing at step S3004 described in the third example embodiment. Moreover, either of the processing at steps S4005 and S4006 may be executed first, or both the processing at steps S4005 and step S4006 may be executed simultaneously.

After that, the image processing device 400 executes the processing at steps S4007 to S4009 that is the same processing as the processing at steps S1010 to S1012 shown in FIG. 9.

Thus, the image processing device 400 according to this example embodiment includes the second association generation part 440 instead of the second association generation part 240 of the image processing device 200 according to the second example embodiment. Moreover, the image processing device 400 includes the third acquisition part 310 and the tracking data generation part 320. Therefore, the image processing device 400 according to this example embodiment can reduce the loss of sales opportunity, the loss due to product disposal and the like due to inadequate merchandise display over a broad area in the store as the image processing device 200 according to the second example embodiment can. Also, the image processing device 400 can integrate product-person association information with high accuracy as the image processing device 300 according to the third example embodiment can. Because association information can be integrated with high accuracy, the accuracy of detecting that an product is returned to a different place from a place where the product has been picked up increases. Therefore, the image processing device 400 according to this example embodiment can further reduce the loss of sales opportunity, the loss due to product disposal, and the like, due to inadequacy of merchandise display than the image processing device 200.

Fifth Example Embodiment

Figure 22:
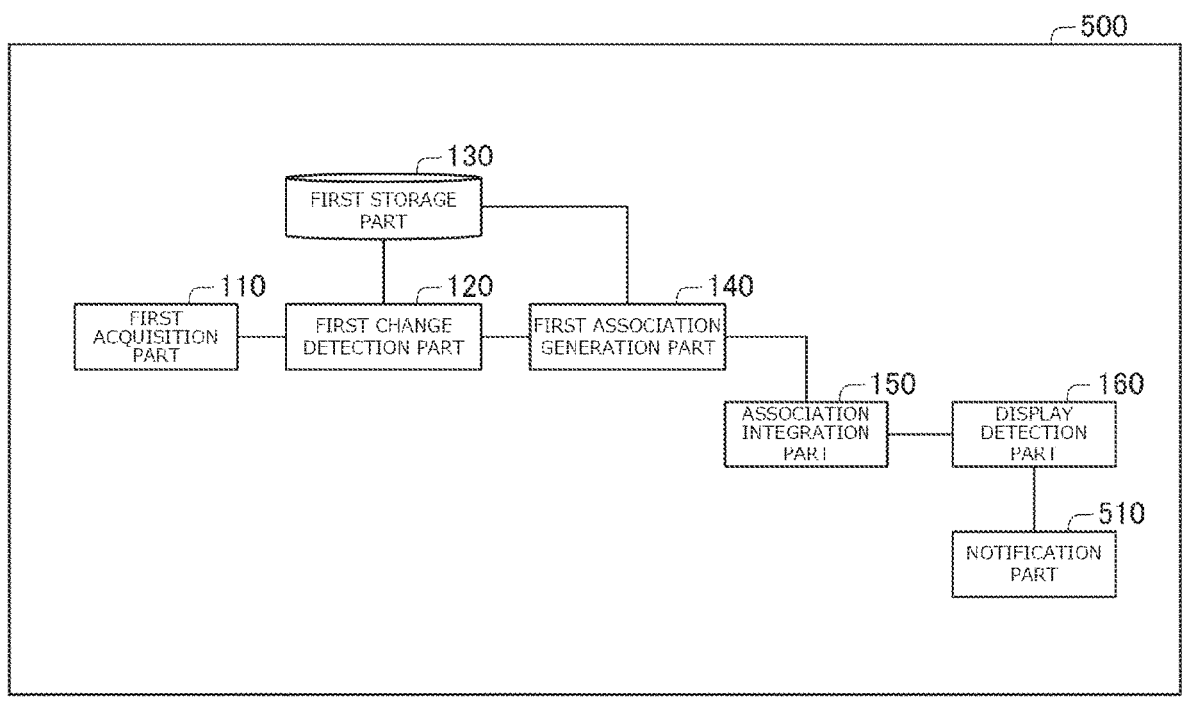
FIG. 22 is a function block diagram showing an example of the function configuration of an image processing device according to a fifth example embodiment.
Figure 23:
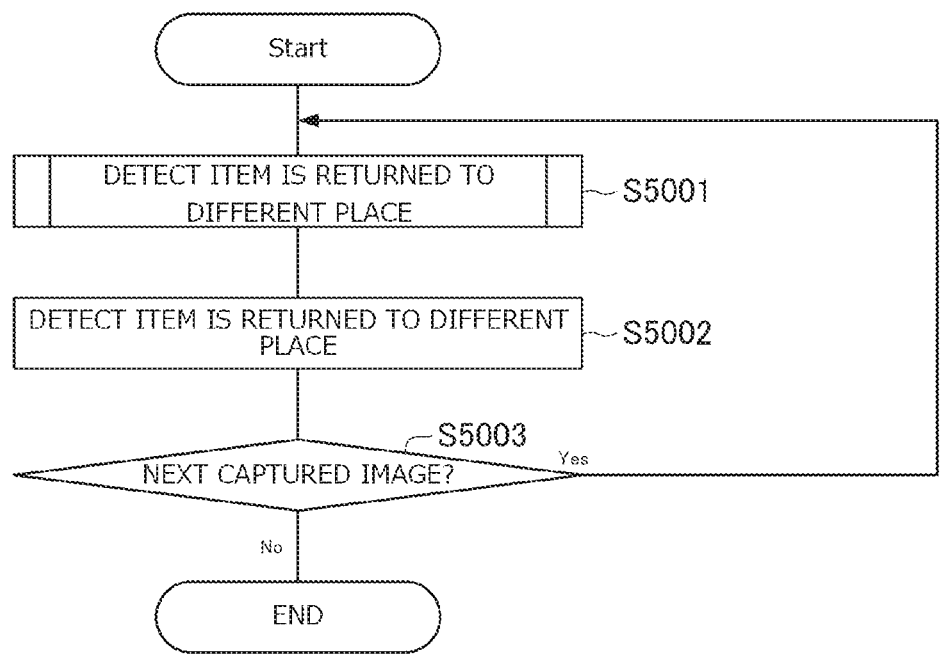
FIG. 23 is a flowchart showing an example of the flow of the operation of the image processing device according to the fifth example embodiment.

Next, referring to FIGS. 22 and 23, a fifth example embodiment will be described. FIG. 22 is a function block diagram showing an example of the configuration of an image processing device 500. FIG. 23 is a flowchart showing an example of the flow of the operation of the image processing device 500.

In this example embodiment, the image processing device 500 will be described that has a notification part 510 in addition to the components included by the image processing device 100 described in the first example embodiment. Because the image processing device 500 has the notification part 510, for example, when the display detection part 160 detects that an product is returned to a different place from a place where the product has been picked up, it is possible to notify to a store staff or the like of the store.

The image processing device 500 in this example embodiment is communicably connected to the imaging device 2 like the image processing device 100 shown in FIG. 1 described in the first example embodiment.

FIG. 22 shows an example of the configuration of the image processing device 500. As shown in FIG. 22, the image processing device 500 according to this example embodiment includes the first acquisition part 110, the first change detection part 120, the first storage part 130, the first association generation part 140, the association integration part 150, the display detection part 160, and the notification part 510 (a notifying unit). Thus, the image processing device 500 according to this example embodiment has the components included by the image processing device 100 described in the first example embodiment, and also has the notification part 510.

In the above description, elements having the same functions as the elements included in the drawings described in the first, second, third, and fourth example embodiments are denoted by the same reference numerals. Below, a component that is characteristic to this example embodiment will be described.

The display detection part 160 receives integrated association information from the association integration part 150, and compares a place where an product has been obtained with a place where the product is returned, thereby detecting that the product is returned to a different place from a place where the product has been picked up. For example, the display detection part 160 provides a signal representing a detection result to the notification part. For example, the signal representing a detection result may be 1 when it is detected that an product is returned to a different place from a place where the product has been picked up, and 0 when it is not detected that an product is returned to a different place from a place where the product has been picked up.

The notification part 510 receives a detection result from the display detection part 16. Then, in a case where the received detection result is a signal representing that an product is returned to a different place from a place where the product has been picked up, the notification part 510 notifies to, for example, a terminal owned by a worker in the store that it is detected that an product is returned to a different place from a place where the product has been picked up. Alternatively, in a case where the received detection result is a signal representing that an product is returned to a different place from a place where the product has been picked up, the notification part 510 may notify to, for example, a POS (Point of Sales) terminal of the store that it is detected that an product is returned to a different place from a place where the product has been picked up, or may notify to, for example, a computer of the headquarters that it is detected that an product is returned to a different place from a place where the product has been picked up. In a case where the received detection result is a signal representing that an product is returned to a different place from a place where the product has been picked up, the notification part 510 may store it into a storage medium installed in the store or the headquarters that it is detected that an product is returned to a different place from a place where the product has been picked up. The notification part 510 may notify it to a predetermined lamp or the like that it is detected that an product is returned to a different place from a place where the product has been picked up.

The notification part 510 can notify in any of the manners illustrated above, or may notify in combination of some of the manners illustrated above.

The above is an example of the component that is characteristic to the image processing device 500.

Next, referring to FIG. 23, the flow of the operation of the image processing device 500 according to this example embodiment will be described. FIG. 23 is a flowchart showing an example of the flow of the operation of the image processing device 500 according to this example embodiment.

Referring to FIG. 23, the image processing device 300 executes the same processing as the processing at steps S1001 to S1011 shown in FIG. 9, and the display detection part 160 thereby detects that an product is returned to a different place from a place where the product has been picked up (step S5001). The display detection part 160 provides, for example, a signal representing a detection result to the notification part.

After the processing at step S5011, the notification part 510 receives the detection result from the display detection part 160. In a case where the received detection result is a signal representing that an product is returned to a different place from a place where the product has been picked up, the notification part 510 notifies it to a terminal owned by a worker of the store (step S5002).

Then, the image processing device 500 executes processing at step S5003 that is the same processing as the processing at step S1012 shown in FIG. 9.

Thus, the image processing device 500 according to this example embodiment has a configuration in which the notification part 510 is added to the image processing device 100. With such a configuration, in a case where an product is returned to a different place from a place where the product has been picked up, it is possible to instantly notify it to a worker of the store. Consequently, it is possible to reduce the loss of sales opportunity, the loss due to product disposal, and the like, caused by inadequate merchandise display.

The notification part 510 may be configured to suspend the timing of notification in a case where a store status or the like satisfies a given condition determined beforehand.

For example, the notification part 510 may be configured to determine whether to suspend the notification in accordance with the customer's stay status in the store. For example, the notification part 510 may be configured to suspend the notification while it can be determined that customers queue up at the cash register (a predetermined number or more queue up) based on a captured image acquired by the imaging device 2 or the like. Also, for example, the notification part 510 may be configured to suspend the notification while it is determined that a customer is present in front of the store shelf 3 that is an operation target where it is detected that an product is returned to a different place from a place where the product has been picked up, based on a captured image acquired by the imaging device 2 or the like. In a case where the image processing device 500 is configured to acquire tracking data, the notification part 510 may be configured to, for example, suspend the notification when it is determined that a customer will come in front of the store shelf 3 that is an operation target where it is detected that an product is returned to a different place from a place where the product has been picked up, based on the tracking data. Thus, the notification part 510 can be configured to suspend the notification when a customer's stay status such as the number of customers in the store or the location of a customer satisfies a predetermined condition. The notification part 510 issues a notification when there is no reason to suspend or when there is no more reason.

Further, the notification part 510 may determine the urgency of notification based on the store shelf 3 to which an product is returned, the type or kind of an product returned to a different place, the relation between an product returned to a different place and the store shelf 3 to which the product is returned, and so on, and control the timing of notification based on the urgency of notification. For example, in a case where fresh food, frozen food, ice cream, or the like is returned to a non-frozen corner or a non-refrigerated corner, it is supposed that the influence gets more if the notification is not immediately issued. Moreover, it is desirable that the relationship between an product and the store shelf 3 to which the product is returned be promptly corrected in a predetermined unfavorable case, for example, a case where a non-food such as a detergent is returned to a produced-food corner. Thus, the notification part 510 can be configured to notify immediately when it is determined that the notification is urgent in accordance with the type of an product returned to a different place. That is, in a case where there is urgency in the notification as described above, for example, even if the abovementioned suspension condition is satisfied, the notification part 510 issues the notification without suspending. On the other hand, in a case where there is no urgency as described above, the notification part 510 suspends the notification until the suspension condition is not satisfied any more. Thus, the notification part 510 may be configured to acquire information representing the urgency of notification and control the timing of the notification based on the acquired information. Meanwhile, for example, the region change classification part 126 or the first extraction part 124 may be configured to determine the type or kind of an product returned to a different place from a place where the product has been picked up, such as fresh food or frozen food, based on the first noted image or the like. For example, the display detection part 160 may be configured to, after detecting that an product is returned to a different place from a place where the product has been picked up, acquire a captured image from information (an identifier, capture time, and so on) relating to a captured image applied to association information, and determine the type or kind of the product based on the acquired captured image.

Thus, the notification part 510 may be configured to determine urgency in accordance with a customer's stay status in the store, the type or kind of an product, and so on, and control the timing of notification in accordance with the urgency of the notification. The notification part 510 may be configured to control the timing of notification based on information other than illustrated above.

In this example embodiment, a case where the image processing device 100 described in the first example embodiment has the notification part 510 has been described. However, the notification part 510 may be included by any of the image processing parts described above other than the image processing device 100. For example, the image processing device 200 described in the second example embodiment, the image processing device 300 described in the third example embodiment, or the image processing part 400 described in the fourth example embodiment may have the notification part 510. Processing to be executed by the notification part 510 in a case where the image processing device 200, the image processing device 300, or the image processing device 400 has the notification part 510 is the same as in a case where the image processing device 100 has. Even if any of the image processing devices has, various modification examples described in this example embodiment can be employed.
<Modification Example of Foreground Region Detection Part>

Next, a modification example of processing by the foreground region detection part included by the first change detection part 120 or the second change detection part 220 included by any of the image processing devices of the above example embodiments will be described.

In the modification example, the foreground region detection part included by the first change detection part 120 or the second change detection part 220 specifies that a target object included in a change region is an object other than an product in the store shelf 3 by further using previously registered shelf region information.

In this modification example, a modification example of the foreground region detection part 121 of the image processing device 100 will be described. However, this modification example can also be applied to any of devices other than the image processing device 200, the image processing device 300, the image processing device 400, the image processing device 500, and the image processing device 100 including the notification information 510.

Figure 24:
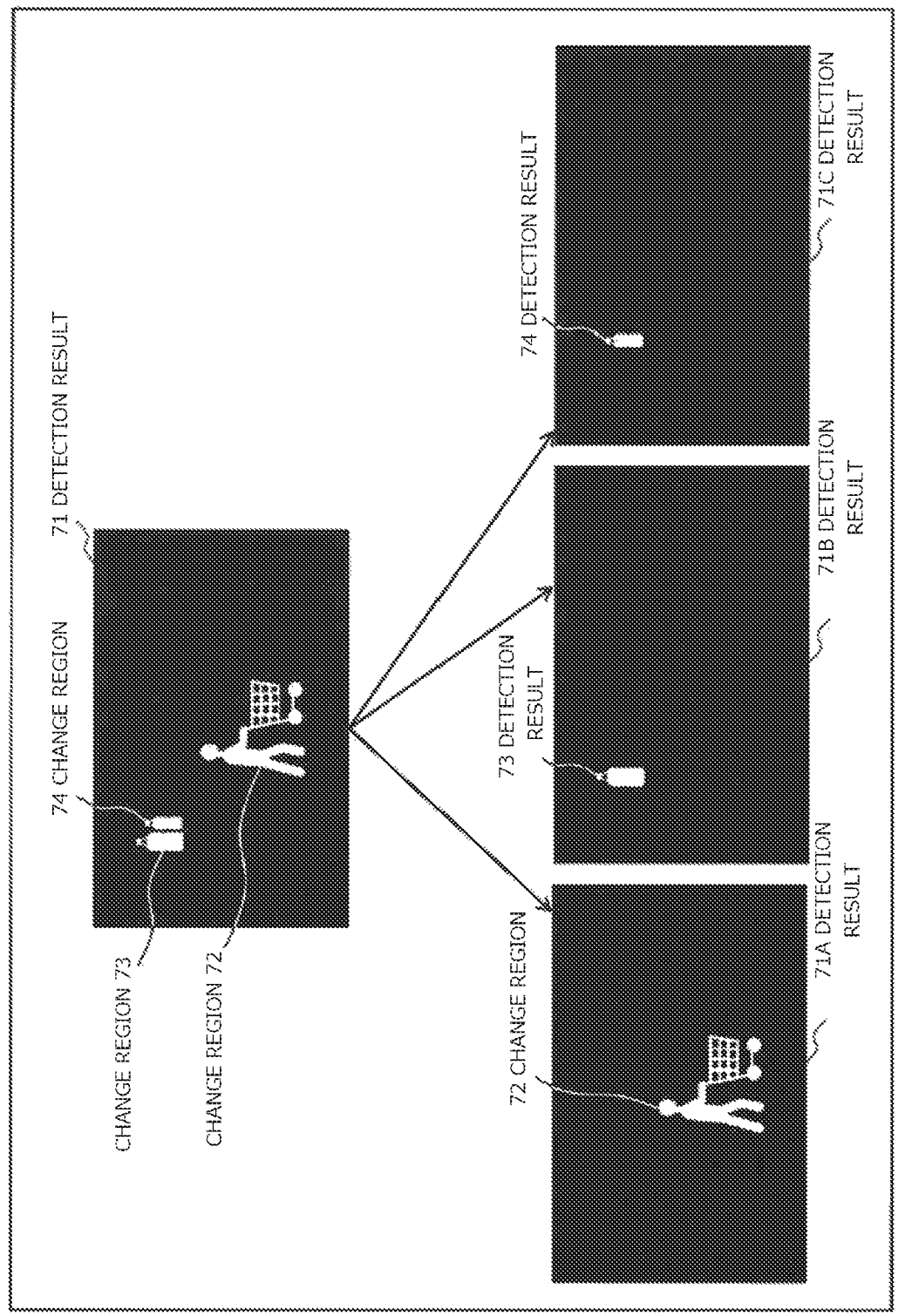
FIG. 24 is a view for describing the operation of a foreground region detection part in a modification example.
Figure 25:
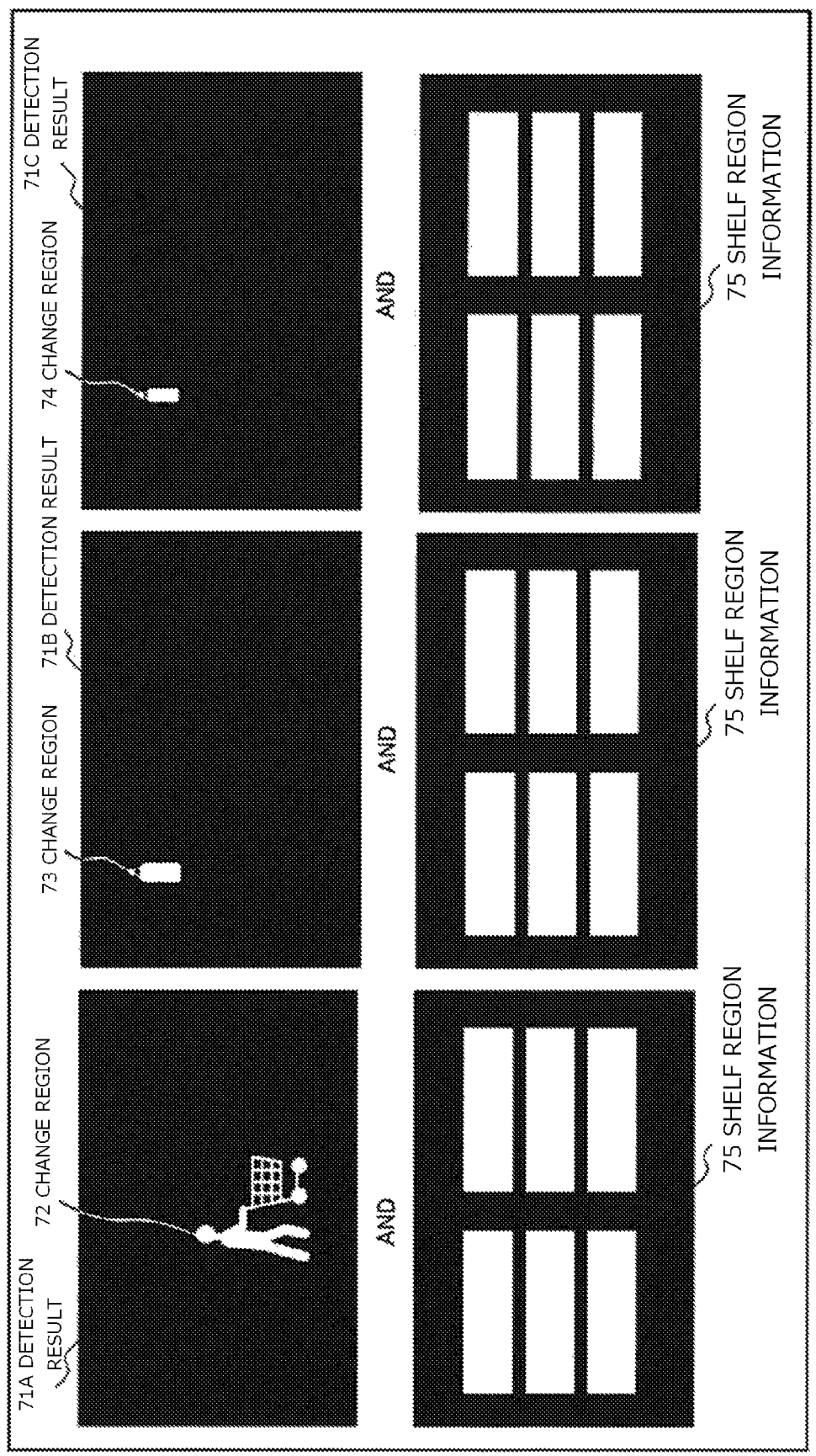
FIG. 25 is a view for describing the operation of a foreground region detection part in a modification example.
Figure 26:
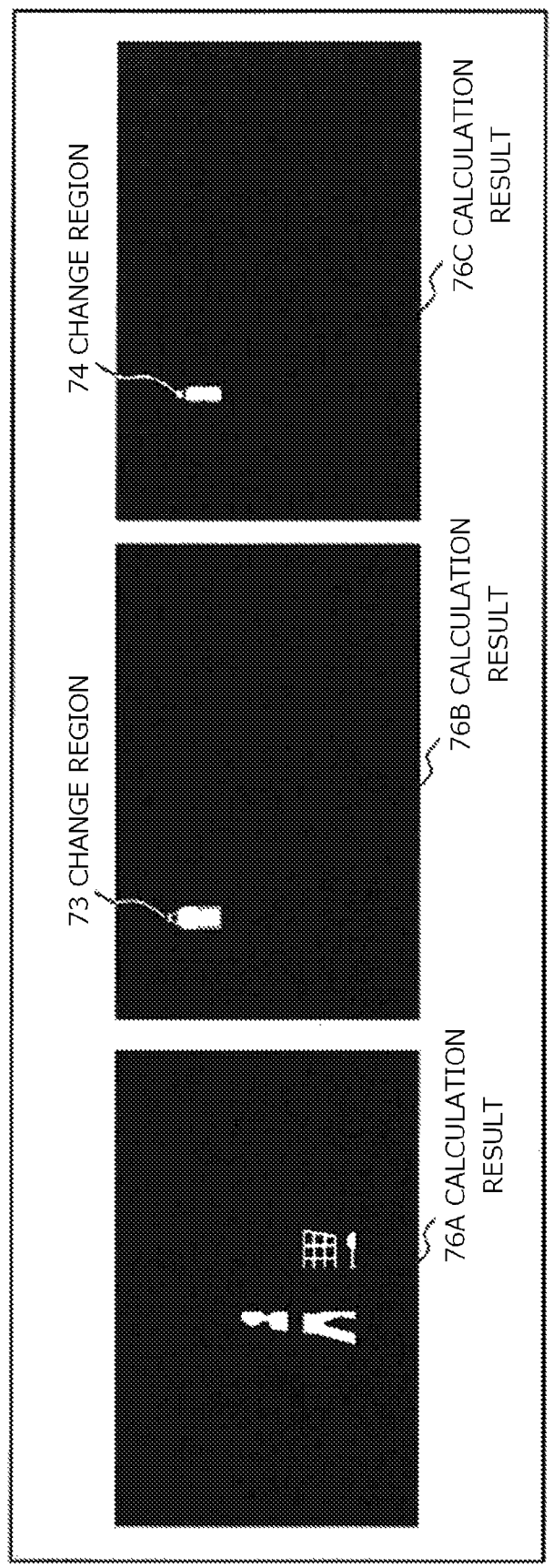
FIG. 26 is a view for describing the operation of a foreground region detection part in a modification example.

FIGS. 24 to 26 are views for describing the operation of the foreground region detection part 121 in this modification example.

For example, it is assumed that the foreground region detection part 121 detects a change region by comparing a captured image provided from the first acquisition part 110 with the background information 131, and generates a detection result 71 that is a binary image showing the change region, for example, as shown in FIG. 24. It is assumed that this detection result includes three change regions of a change region 72, a change region 73, and a change region 74. In such a case, the foreground region detection part 121 generates a detection result 71A, a detection result 71B, and a detection result 71C that are discrete binary images for the respective change regions by a general labeling method with respect to the detection result 71.

That is, in a case where a detection result includes a plurality of change regions, the foreground region detection part 121 generates a plurality of binary images that the respective change regions are included in discrete binary images.

Then, the foreground region detection part 121 determines whether or not a change region is a region where a change relating to a change of an product is detected, based on previously registered shelf region information and each of a plurality of binary images.

The shelf region information represents a region where merchandise is displayed in the store shelf 3. The merchandise monitoring system 1 monitors merchandise in the store shelf 3. Therefore, a region where merchandise is displayed shown by the shelf region information is also referred to as a monitoring target region. Moreover, the shelf region information is also referred to as monitoring region information. The shelf region information may be an image of the same size as a captured image acquired by the first acquisition part 110, and a binary image that expresses the monitoring target region of the monitoring target store shelf 3 with pixel values of 255 and the remaining region with pixel values 0. Moreover, the number of monitoring target regions included in the shelf region information may be one or plural, for example. The shelf region information may be stored, for example, in the first storage part 130 beforehand. The shelf region information includes information for specifying the store shelf 3 included in the captured image acquired by the first acquisition part 110.

The foreground region detection part 121 calculates a logical product of shelf region information 75, for example, as shown in FIG. 25 associated with the store shelf 3 included in a captured image acquired by the first acquisition part 110 and each of the detection results 71A, 71B and 71C, for each corresponding pixel. As shown in FIG. 25, in the shelf region information 75, a monitoring target region is expressed in white, and therefore, the shelf region information 75 includes six monitoring target regions.

A calculation result 76A shown in FIG. 26 is the result of calculation of a logical product of the shelf region information 75 and the detection result 71A. A calculation result 76B is the result of calculation of a logical product of the shelf region information 75 and the detection result 71B. A calculation result 76C is the result of calculation of a logical product of the shelf region information 75 and the detection result 71C.

Objects such as a person and a cart other than merchandise straddle a plurality of shelf regions. Therefore, as a result of calculation of a logical product of the detection result 71A and the shelf region information 75, a portion with pixel values of 255 (a white portion) representing a change region is divided into a plurality of regions as in the calculation result 76A shown on the left side of FIG. 26. On the other hand, a portion (a white portion) representing a change region in each of the calculation results 76B and 76C is a continuous region (a set of pixels each having a pixel value of 255 and each having an adjacent pixel whose pixel value is 255), showing no change between the detection results 71B and 76C. Products displayed in a display region (a monitoring target region) of the store shelf 3 do not straddle a plurality of monitoring target regions. Therefore, in a case where a change region is divided into a plurality of regions as in the calculation result 76A, the foreground region detection part 121 detects that a change of this change region is a change due to an object other than products. In such a case, the foreground region detection part 121 does not include it into a detection result to be provided to the foreground region tracking part 123. In other words, the foreground region detection part 121 provides the detection result 71B and the detection result 71C to the foreground region tracking part 123.

With such a configuration, the foreground region tracking part 123 can provide a change relating to an product displayed in the store shelf 3 to the first extraction part 124 and the second extraction part 125. In other words, because the region change classification part 126 can perform classification of a change relating to an product displayed in the store shelf 3, it is possible to prevent the accuracy of classification of a change relating to an product from decreasing due to an effect of an object other than the product. Moreover, when a change relating to a change region is a change due to an object other than an product, the foreground region detection part 121 can perform classification before classification by the region change classification part 126, and therefore, it is possible to reduce the amount of processing by the region change classification part 126.

<Hardware Configuration>

Figure 27:
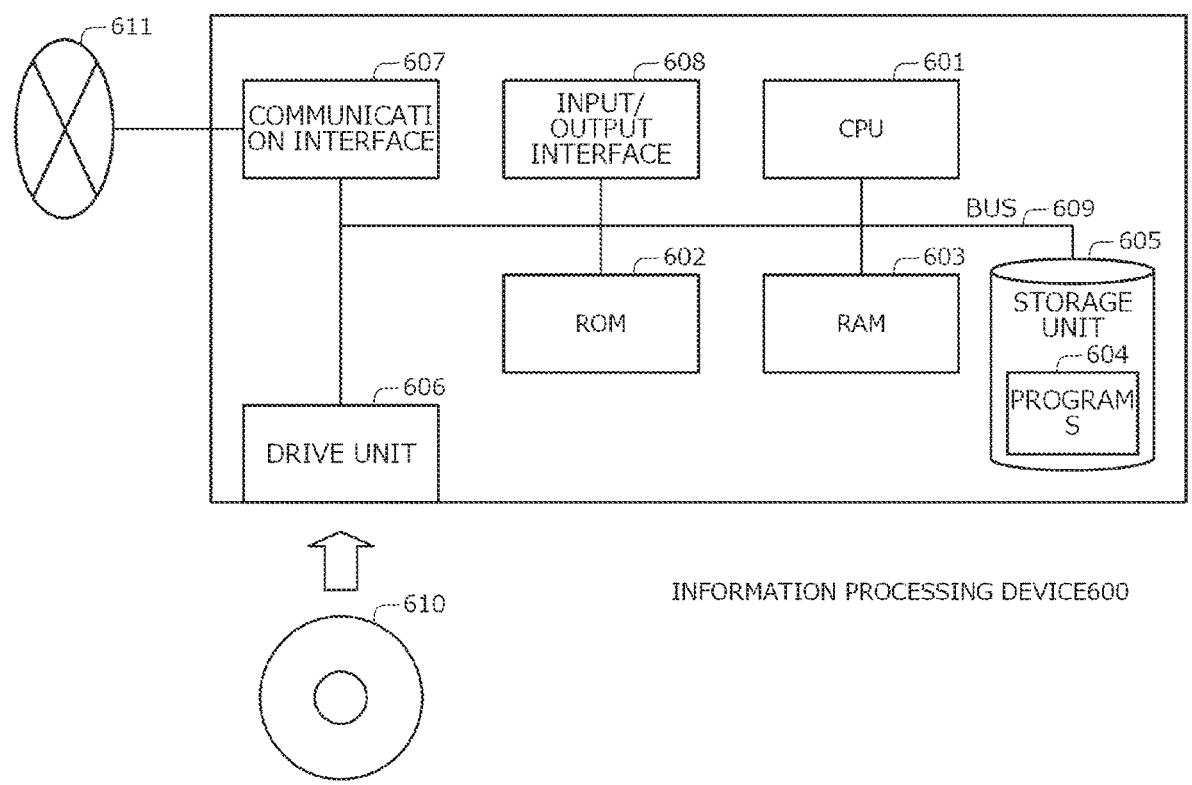
FIG. 27 is a view illustrating a hardware configuration of a computer (an information processing device) that can realize the respective example embodiments.

In the respective exemplary embodiments of this disclosure, the respective components included by the image processing devices represent blocks of function units. The whole or part of the components included by the respective image processing devices are realized by any combination of an information processing device 600, for example, as shown in FIG. 27 and a program. FIG. 27 is a block diagram showing an example of a hardware configuration of the information processing device 600 realizing the respective components of the image processing devices. The information processing device 600 includes, for example, the following components as shown below:

CPU (Central Processing Unit) 601;
ROM (Read Only Memory) 602;
RAM (Random Access Memory) 603;
programs 604 loaded to the RAM 603;
a storage unit 605 for storing the programs;
a drive unit 606 that reads from and writes into a recording medium 610 outside the information processing device 600;
a communication interface 607 connected to a communication network 611 outside the information processing device 600;
an input/output interface 608 for input/output of data; and
a bus 609 connecting the respective components.

The components included by the image processing devices in the example embodiments described above are realized by acquisition and execution of the programs 604 realizing these functions by the CPU 601. The programs 604 realizing the functions of the components included by the image processing devices is, for example, previously stored in the storage unit 605 or the ROM 602 and, as necessary, loaded to the RAM 603 and executed by the CPU 601. Meanwhile, the programs 604 may be provided to the CPU 601 via the communication network 611, or may be previously stored in the recording medium 610, and retrieved and provided to the CPU 601 by the drive unit 606.

As a method for realizing the image processing device, there are various modification examples. For example, the image processing device may be realized by any combination of a discrete information processing device 600 for each component and a program. Alternatively, a plurality of components included by the image processing device may be realized by any combination of one information processing device 600 and a program.

Further, the whole or part of the components included by the image processing device can be realized by other general-purposed or dedicated circuits, processors, and so on, or a combination thereof. They may be configured by a single chip, or may be configured by a plurality of chips connected via a bus.

The whole or part of the components included by the image processing device may be realized by a combination of the abovementioned circuits and so on and a program.

In a case where the whole or part of the components included by the image processing device are realized by a plurality of information processing devices, circuits, and so on, the plurality of information processing devices, circuits, and so on may be intensively arranged, or distributedly arranged. For example, the information processing devices, circuits, and so on may be realized as a form in which a client server system, a cloud computing system, and so on are connected via a communication network.

Sixth Example Embodiment

Figure 28:
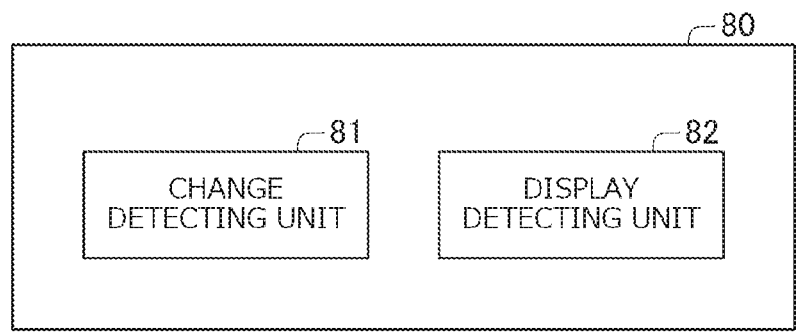
FIG. 28 is a function block diagram showing an example of the configuration of an image processing device according to a sixth example embodiment.

Next, referring to FIG. 28, a sixth example embodiment will be described. In the sixth example embodiment, the outline of the configuration of an image processing device 80 will be described Referring to FIG. 28, the image processing device 80 has a change detecting unit 81 and a display detecting unit 82. For example, the image processing device 80 has an arithmetic logic unit such as a CPU and a storage unit, which are not shown in the drawings. The image processing device 80 realizes the above processing units, for example, by execution of a program stored in the storage unit by the arithmetic logic unit.

The change detecting unit 81 detects a change in display status of a monitoring target product based on a captured image in which the product is shown. For example, the change detecting unit 81 acquires a captured image from outside the image processing device 80. Alternatively, the change detecting unit 81 acquires a captured image captured by the image processing device 80. Then, the change detecting unit 81 detects a change in display status of the product based on the acquired captured image.

The display detecting unit 82 detects that the product is returned to a different place from a place where the product has picked up based on the change in display status of the product detected by the change detecting unit 81 and on a person included in the captured image. For example, the display detecting unit 82 receives the result of detection by the change detecting unit 81. Then, the display detecting unit 82 detects that the product is returned to a different place from a place where the product has been picked up based on the change in display status of the product and on the person.

Thus, the image processing device 80 in this example embodiment has the change detecting unit 81 and the display detecting unit 82. With such a configuration, the image processing device 80 can detect that an product is returned to a different place from a place where the product has been picked up based on a change of a monitoring target detected by the change detecting unit 81 and a person included in a captured image.

Further, the image processing device 80 described above can be realized by installation of a predetermined program in the image processing device 80. To be specific, a program according to another aspect is a program for causing an image processing device to realize: a change detecting unit detecting a change of a monitoring target product based on a captured image in which the monitoring target product is shown; and a display detecting unit detecting that the product is returned to a different place from a place where the product has been picked up based on the change of the monitoring target detected by the change detecting unit and a person included in the captured image.

Further, an image processing method executed by the image processing device 80 described above is a method in which the image processing device detects a change of a monitoring target product based on a captured image in which the monitoring target product is shown and detects that the product is returned to a different place from a place where the product has been picked up based on the detected change of the monitoring target and a person included in the captured image.

The program and the image processing method with the above configurations also have the same actions as the image processing device 80, and therefore, can achieve the abovementioned object.

<Supplementary Notes>

The whole or part of the example embodiments disclosed above can be described as the following supplementary notes. Below, the outline of an image processing device will be described.

(Supplementary Note 1)

An image processing device comprising:

a change detecting unit configured to, based on a captured image in which an product to be monitored is shown, detect a change in display status of the product; and a display detecting unit configured to detect that the product is returned to a different place from a place where the product has been picked up based on the change in display status of the product detected by the change detecting unit and on a person included in the captured image.

(Supplementary Note 2)

The image processing device according to Supplementary Note 1, wherein:

the change detecting unit has an associating unit configured to associate changes in display status of the product detected by the change detection unit on basis of the person; and the display detecting unit detects that the product is returned to a different place from a place where the product has been picked up based on a result of associating by the associating unit.

(Supplementary Note 3)

The image processing device according to Supplementary Note 2, wherein:

the associating unit has an association generating unit configured to associate the change in display status of the product detected by the change detecting unit with the person, and generate association information representing a relation between the change in display status of the product and the person, and an association integrating unit configured to integrate the association information of a same person, of the association information generated by the association generating unit; and the display detecting unit detects that the product is returned to a different place from a place where the product has been picked up based on a result of integrating by the association integrating unit.

(Supplementary Note 4)

The image processing device according to any of Supplementary Notes 1 to 3, wherein:

the change detecting unit is configured to detect the change in display status of the product, and also detect the person; and the display detecting unit detects that the product is returned to a different place from a place where the product has been picked up based on the change in display status of the product and the person detected by the change detecting unit.

(Supplementary Note 5)

The image processing device according to any of Supplementary Notes 1 to 4, further comprising a tracking data generating unit configured to generate tracking data of the person based on the captured image, wherein the display detecting unit detects that the product is returned to a different place from a place where the product has been picked up based on the change in display status of the product detected by the change detecting unit and the tracking data generated by the tracking data generating unit.

(Supplementary Note 5-1)

The image processing device according to Supplementary Notes 5, wherein the tracking data generating unit generates the tracking data that is information including an identifier for identifying a person and an identifier corresponding to a location of the product which the person visits.

(Supplementary Note 6)

The image processing device according to any of Supplementary Notes 1 to 5, wherein the change detecting unit detects the change in display status of the product by comparing the captured image in which the product to be monitored is shown with background information showing an image captured earlier than said captured image.

(Supplementary Note 7)

The image processing device according to Supplementary Note 6, further comprising a background information updating unit configured to update the background information, wherein in a case where a predetermined condition is satisfied, the background information updating unit updates a portion other than a portion corresponding to a change region that is a region in which display of the product has changed of the background information.

(Supplementary Note 8)

The image processing device according to any of Supplementary Notes 1 to 7, further comprising a notifying unit configured to issue a given notification based on a result of detecting by the display detecting unit, wherein the notifying unit controls timing of the notification in accordance with urgency of the notification.

(Supplementary Note 8-1)

The image processing device according to Supplementary Note 8, wherein the notifying unit is configured to suspend the notification in a case where a given condition is satisfied, and execute the notification without suspending in a case where the given condition is satisfied and there is urgency.

(Supplementary Note 8-2)

The image processing device according to Supplementary Note 8 or 8-1, wherein the notifying unit determines the urgency of the notification in accordance with a type of the product for which the display detecting unit detects that the product is returned to a different place from a place where the product has been picked up.

(Supplementary Note 9)

An image processing method executed by an image processing device, the image processing method comprising:

based on a captured image in which an product to be monitored is shown, detecting a change in display status of the product; and detecting that the product is returned to a different place from a place where the product has been picked up based on the detected change in display status of the product and on a person included in the captured image.

(Supplementary Note 9-1)

The image processing method according to Supplementary Note 9, further comprising associating changes in display status of the product detected by the change detection unit on basis of the person, wherein it is detected that the product is returned to a different place from a place where the product has been picked up based on a result of associating by the associating unit.

(Supplementary Note 9-2)

The image processing method according to Supplementary Note 9-1, wherein:

in the associating,
the change in display status of the product detected by the change detecting unit is associated with the person, and association information representing a relation between the change in display status of the product and the person is generated, and
of the association information generated by the association generating unit, the association information of a same person are integrated; and
it is detected that the product is returned to a different place from a place where the product has been picked up based on a result of integrating by the association integrating unit.

(Supplementary Note 10)

A non-transitory computer-readable medium storing a program comprising instructions for causing an image processing device to realize:

a change detecting unit configured to, based on a captured image in which an product to be monitored is shown, detect a change in display status of the product; and a display detecting unit configured to detect that the product is returned to a different place from a place where the product has been picked up based on the change in display status of the product detected by the change detecting unit and on a person included in the captured image.

(Supplementary Note 10-1)

The non-transitory computer-readable medium storing the program according to Supplementary Note 10, wherein:

the change detecting unit has an associating unit configured to associate changes in display status of the product detected by the change detection unit on basis of the person; and the display detecting unit detects that the product is returned to a different place from a place where the product has been picked up based on a result of associating by the associating unit.

(Supplementary Note 10-2)

The non-transitory computer-readable medium storing the program according to Supplementary Note 10-1, wherein:

the associating unit has
an association generating unit configured to associate the change in display status of the product detected by the change detecting unit with the person, and generate association information representing a relation between the change in display status of the product and the person, and
an association integrating unit configured to integrate the association information of a same person, of the association information generated by the association generating unit; and
the display detecting unit detects that the product is returned to a different place from a place where the product has been picked up based on a result of integrating by the association integrating unit.

The program described in the example embodiments and supplementary notes is stored in a storage unit or recorded on a computer-readable recording medium. For example, the recording medium is a portable medium such as a flexible disk, an optical disk, a magneto-optical disk, and a semiconductor memory.

The configurations and details can be changed in various manners that can be understood by one skilled in the art within the scope.

The some non-limiting embodiments are based upon and claims the benefit of priority from Japanese patent application No. 2017-232451, filed on Dec. 4, 2017, the disclosure of which is incorporated herein in its entirety by reference.

DESCRIPTION OF NUMERALS 1 merchandise monitoring system
2 imaging device
3 store shelf
100 image processing device
110 first acquisition part
120 first change detection part
121 foreground region detection part
122 background information update part
123 foreground region tracking part
124 first extraction part
125 second extraction part
126 region change classification part
130 first storage part
131 background information
132 shelf change model
133 foreground information
134 person information
140 first association generation part
150 association integration part 160 display detection part
200 image processing device
210 second acquisition part
220 second change detection part
230 second storage part
240 second association generation part
250 association integration part
4 merchandise monitoring system
5 imaging device
300 image processing device
310 third acquisition part
320 tracking data generation part
340 first association generation part
400 image processing device
440 second association generation part
500 image processing device
510 notification part
600 information processing device
601 CPU
602 ROM
603 RAM
604 programs
605 storage unit
606 drive unit
607 communication interface
608 input/output interface
609 bus
610 recording medium
611 communication network
71 detection result
72 change region
73 change region
74 change region
75 shelf region information
76 calculation result
80 image processing device
81 change detecting unit
82 display detecting unit
90 classification result
91 second noted image
92 first noted image
93 change type

The invention claimed is:

1. An image processing device comprising:
at least one memory configured to store instructions; and
at least one processor configured to execute the instructions to:
detect a change in display status of a product, based on a captured image including the product;
when the change is detected, associate the change in the display status of the product in which the change is detected with a person included in the captured image, and generate association information representing a relation between the change in the display status of the product and the person;
integrate pieces of the association information including the person determined to be a same person, based on information representing the person included in the association information; and
determine that the product is returned to a different place from a place where the product has been picked up based on the place where the product has been picked up by the person and the place where the product is returned according to a result of integration.

2. The image processing device according to claim 1 tracking wherein the at least one processor is configured to:
generate tracking data of the person based on the captured image,
detect that the product is returned to the different place based on the detected change and the generated tracking data.

3. The image processing device according to claim 2, wherein the tracking data includes a person identifier and an identifier corresponding to a location of the product.

4. The image processing device according to claim 1, wherein the at least one processor is configured to:
detect the change product by comparing the captured image with a second image captured earlier than the captured image.

5. The image processing device according to claim 4, wherein the at least one processor is configured to:
update the second image; and
in a case where a predetermined condition is satisfied, update a portion of the second image, the portion corresponding to a non-change region.

6. The image processing device according to claim 1, wherein the at least one processor is configured to:
transmit a notification based on a result of the detecting; and
control timing of the notification in accordance with urgency of the notification.

7. The image processing device according to claim 6, wherein the at least one processor is configured to:
suspend the notification in a case where a given condition is satisfied; and
execute the notification without suspending in a case where the given condition is satisfied and there is urgency.

8. The image processing device according to claim 6, wherein the at least one processor is configured to:
determine the urgency of the notification based on a type of the product and a place where the product has been picked up.

9. The image processing device according to claim 6, wherein the at least one processor is configured to:
determine the urgency of the notification based on a number of the customer in the store.

10. The image processing device according to claim 6, wherein the at least one processor is configured to:
determine the urgency of the notification based on a location of the customer in the store.

11. The image processing device according to claim 1, wherein the at least one processor is configured to:
transmit a notification, to a terminal of worker in the store, based on a result of detecting.

12. An image processing method executed by an image processing device, the image processing method comprising:
detecting a change in display status of a product, based on a captured image including the product;
when the change is detected, associating the change in the display status of the product in which the change is detected with a person included in the captured image, and generating association information representing a relation between the change in the display status of the product and the person;
integrating pieces of the association information including the person determined to be a same person, based on information representing the person included in the association information; and
determining that the product is returned to a different place from a place where the product has been picked up based on the place where the product has been picked up by the person and the place where the product is returned according to a result of integration.

13. A non-transitory computer-readable medium storing a instructions to cause a computer to execute operations comprising:
- detecting a change in display status of a product, based on a captured image including the product;
- when the change is detected, associating the change in the display status of the product in which the change is detected with a person included in the captured image, and generating association information representing a relation between the change in the display status of the product and the person;
- integrating pieces of the association information including the person determined to be a same person, based on information representing the person included in the association information; and
- determining that the product is returned to a different place from a place where the product has been picked up based on the place where the product has been picked up by the person and the place where the product is returned according to a result of integration.

* * * * *